(12) United States Patent
Rubner et al.

(10) Patent No.: US 10,865,767 B2
(45) Date of Patent: Dec. 15, 2020

(54) ROTOR FOR A WIND TURBINE, ROTOR BLADE FOR A WIND TURBINE, SLEEVE, AND METHOD FOR ASSEMBLING A ROTOR

(71) Applicant: Wobben Properties GmbH, Aurich (DE)

(72) Inventors: Florian Rubner, Aurich (DE); Florian Stops, Stassfurt OT Neundorf (DE)

(73) Assignee: Wobben Properties GmbH, Aurich (DE)

( * ) Notice: Subject to any disclaimer, the term of this patent is extended or adjusted under 35 U.S.C. 154(b) by 47 days.

(21) Appl. No.: 16/308,229

(22) PCT Filed: Jun. 8, 2017

(86) PCT No.: PCT/EP2017/063917
§ 371 (c)(1),
(2) Date: Dec. 7, 2018

(87) PCT Pub. No.: WO2017/211929
PCT Pub. Date: Dec. 14, 2017

(65) Prior Publication Data
US 2019/0264650 A1    Aug. 29, 2019

(30) Foreign Application Priority Data

Jun. 8, 2016 (DE) .................. 10 2016 110 551

(51) Int. Cl.
*F03D 1/06* (2006.01)
*F16B 11/00* (2006.01)

(52) U.S. Cl.
CPC ......... *F03D 1/0658* (2013.01); *F03D 1/0675* (2013.01); *F16B 11/006* (2013.01);
(Continued)

(58) Field of Classification Search
CPC .... F03D 1/0658; F03D 1/0675; F16B 11/006; Y02E 10/721; Y02P 70/523;
(Continued)

(56) References Cited

U.S. PATENT DOCUMENTS 4,893,973 A * 1/1990 Herb .................. F16B 13/122
411/55
6,371,730 B1   4/2002 Wobben
(Continued)

FOREIGN PATENT DOCUMENTS

CN   201925291 U    8/2011
CN   204152734 U *  2/2015
(Continued)

*Primary Examiner* — Eldon T Brockman
(74) *Attorney, Agent, or Firm* — Seed Intellectual Property Law Group LLP

(57) ABSTRACT

A rotor for a wind power installation, to a rotor blade for a wind power installation, to a sleeve, and to a method for the assembly of a rotor. A rotor for a wind power installation, having at least one rotor blade which is connected by means of a face side to a rotor hub, wherein the rotor blade comprises a transverse bolt recess which extends substantially radially with respect to the longitudinal axis of the rotor blade and in which a transverse bolt is arranged, wherein the transverse bolt has a transverse bolt opening, a longitudinal bolt recess which extends substantially parallel to the longitudinal axis of the rotor blade, wherein the longitudinal bolt recess and the transverse bolt recess have a common passage, and a longitudinal bolt is arranged within the longitudinal bolt recess and within the transverse bolt opening, a sleeve is arranged in the longitudinal bolt recess, wherein the longitudinal bolt extends through a cavity of the sleeve.

18 Claims, 20 Drawing Sheets

(52) U.S. Cl.
CPC ..... *F05B 2230/60* (2013.01); *F05B 2240/302* (2013.01); *F05B 2260/30* (2013.01); *F05B 2260/301* (2013.01); *Y02E 10/72* (2013.01); *Y02P 70/50* (2015.11)

(58) Field of Classification Search
CPC ............ F05B 2260/30; F05B 2260/301; F05B 2240/302; F05B 2230/60
See application file for complete search history.

(56) References Cited

U.S. PATENT DOCUMENTS

| | | | |
|---|---|---|---|
| 7,722,328 B2 | 5/2010 | Wobben | |
| 8,133,029 B2 * | 3/2012 | Quell | F03D 1/0658 |
| | | | 416/204 R |
| 9,316,203 B2 * | 4/2016 | Guenther | F03D 1/0658 |
| 9,765,804 B2 | 9/2017 | Schaeffer | |
| 10,077,757 B2 | 9/2018 | Kannenberg et al. | |
| 2007/0231146 A1 | 10/2007 | Birkemeyer et al. | |
| 2009/0263250 A1 * | 10/2009 | Quell | F03D 1/0658 |
| | | | 416/204 R |
| 2013/0121836 A1 * | 5/2013 | Guenther | F03D 1/0675 |
| | | | 416/220 R |
| 2014/0356176 A1 | 12/2014 | Caruso | |
| 2017/0022969 A1 | 1/2017 | Hoffmann | |

FOREIGN PATENT DOCUMENTS

| | | | |
|---|---|---|---|
| CN | 204152734 U | 2/2015 | |
| CN | 105556138 A | 5/2016 | |
| DE | 19733372 C1 | 1/1999 | |
| DE | 10324166 A1 | 12/2004 | |
| DE | 102006014742 A1 | 10/2007 | |
| DE | 102014005452 A1 | 10/2015 | |
| DE | 102014206670 A1 | 10/2015 | |
| EP | 2592264 A1 | 5/2013 | |
| JP | 2004293256 A | 10/2004 | |
| JP | 2015500420 A | 1/2015 | |
| KR | 20130061809 A | 6/2013 | |
| KR | 101345716 B1 * | 12/2013 | ........... F03D 1/0658 |
| KR | 101345716 B1 | 12/2013 | |
| KR | 20140110919 A | 9/2014 | |
| RU | 2205130 C1 | 5/2003 | |
| RU | 67168 U | 10/2007 | |
| RU | 2469208 C2 | 12/2012 | |
| WO | 01/42647 A2 | 6/2001 | |
| WO | 2015155079 A1 | 10/2015 | |

* cited by examiner

ROTOR FOR A WIND TURBINE, ROTOR BLADE FOR A WIND TURBINE, SLEEVE, AND METHOD FOR ASSEMBLING A ROTOR

BACKGROUND

Technical Field

The invention relates to a rotor for a wind power installation, to a rotor blade for a wind power installation, to a sleeve, and to a method for the assembly of a rotor.

Description of the Related Art

Wind power installations of the type mentioned in the introduction are well known. The presently most common type of wind power installation is the so-called horizontal-axis wind power installation, which is commonly equipped with three rotor blades, wherein wind power installations with one, two, four or more rotor blades are also possible. Such wind power installations have increasingly larger structural forms in order to firstly achieve a higher nominal power and secondly permit improved utilization of the wind.

Larger designs of wind power installations may inter alia have greater hub heights and/or axle heights and/or larger rotor diameters. Correspondingly, such wind power installations may also have larger generators and/or larger infeed lines. In particular, the larger rotor diameters result in higher forces and/or moments on the wind power installation. As a result of these larger forces and/or moments, it is firstly the case that the main components of a wind power installation, for example the spar flanges within a rotor blade, are dimensioned to be larger or so as to have a greater load capacity, and it is secondly also the case that further components, such as for example fastening elements, are dimensioned to be larger or so as to have a greater load capacity.

Since rotor blades generally have to be transported from a production site to an erection side of the wind power installation and assembled there on the hub, the use of split rotor blades, in particular in the case of rotor blades with large extents, is commonly necessary or advantageous. Split rotor blades, which thus have at least two parts in a longitudinal direction, are known for example from DE 10 2014 206 670 A1. Owing to the abovementioned larger structural forms of wind power installations and the commonly associated enlargement of the individual rotor blades, it is generally also the case that the forces and/or moments within a rotor and/or rotor blade increase. Therefore, the connection between a rotor blade and a rotor hub or between a first rotor blade part and a second rotor blade part and/or further rotor blade parts should preferably be made stronger than would be necessary in the case of relatively small rotor blades.

A rotor blade is generally fastened by means of a face side in the region of the rotor blade root to a rotor hub and/or to a blade adapter. Furthermore, two rotor blade parts are likewise fastened to one another at two corresponding face sides. DE 197 33 372 C1 or DE 103 24 166 A1 disclose, for a fastening of said type, for example tension elements which run within the rotor blade material and which are normally designed as so-called longitudinal bolts. To introduce such tension elements into the rotor blades, the provision of openings within the rotor blade is necessary. Such openings form notches in the material, which generally result in material weakening. This material weakening is particularly relevant in particular in a fiber composite material from which rotor blades are generally composed or which the rotor blades generally comprise, because load-bearing fibers in the rotor blade may be severed.

Owing to the abovementioned dimensions of modern wind power installations, said tension elements and corresponding fastening elements must generally be of particularly large dimensions. This dimensioning of the fastening elements firstly makes the handling of said fastening elements more difficult, and secondly, improper handling of said fastening elements can further weaken the material. Aside from this further material weakening, the provision of such rotor blades may be associated with particularly great expenditure of time. The associated outlay in terms of personnel results in further costs. Furthermore, further auxiliary measures are commonly necessary, for example the alignment and/or fixing of individual components in the fastening region.

The German Patent and Trade Mark Office performed a search on the following prior art in the priority application relating to the present application: DE 197 33 372 C1, DE 103 24 166 A1, DE 10 2006 014 742 A1, DE 10 2014 005 452 A1, DE 10 2014 206 670 A1, WO 2001/042 647 A2.

BRIEF SUMMARY

Provided is a rotor for a wind power installation, a rotor blade for a wind power installation, a sleeve and a method for the assembly of a rotor, which reduce or eliminate one or more of the stated disadvantages. Provided is a rotor for a wind power installation, a rotor blade for a wind power installation, a sleeve and a method for the assembly of a rotor which permit simplified assembly of a wind power installation. Provided is a rotor for a wind power installation, a rotor blade for a wind power installation, a sleeve and a method for the assembly of a rotor, which lead to cost savings and/or reduced production times and/or improve the quality of the wind power installations.

According to a first aspect of the present invention, provided is a rotor for a wind power installation, having at least one rotor blade which is connected by means of a face side to a rotor hub, wherein the rotor blade comprises a transverse bolt recess which extends substantially radially with respect to the longitudinal axis of the rotor blade and in which a transverse bolt is arranged, wherein the transverse bolt has a transverse bolt opening, a longitudinal bolt recess which extends substantially parallel to the longitudinal axis of the rotor blade, wherein the longitudinal bolt recess and the transverse bolt recess and/or transverse bolt opening have a common passage, and a longitudinal bolt is arranged within the longitudinal bolt recess and within the transverse bolt opening, a sleeve is arranged in the longitudinal bolt recess, wherein the longitudinal bolt extends through a cavity of the sleeve.

The rotor comprises inter alia the rotor hub and at least one rotor blade. The rotor hub is the connecting element between the at least one rotor blade and further installation components. The rotor hub therefore comprises a number of rotor blade connections, wherein the number of rotor blade connections is preferably equivalent to the number of rotor blades to be connected. Furthermore, the rotor hub generally comprises a connection for a shaft, wherein the shaft can transmit the rotational movement of the rotor hub to a generator. A rotor blade generally extends from a rotor blade root, which in the operating state is arranged in a region facing toward the rotor hub, to a rotor blade tip. In particular, a rotor blade may have a face side in the root region. Said face side furthermore preferably has a circular cross section orthogonally with respect to the longitudinal extent of the rotor blade.

The transverse bolt recess extending substantially radially with respect to the longitudinal axis of the rotor blade has a central axis which is arranged substantially orthogonally with respect to the longitudinal axis of the rotor blade. Furthermore, said central axis is preferably oriented so as to be directed coaxially with respect to a surface orthogonal at that point on the outer side of the rotor blade at which the transverse bolt recess is arranged. The transverse bolt has a transverse bolt opening which runs preferably radially with respect to its longitudinal axis. The transverse bolt recess is preferably configured as a blind hole, such that the transverse bolt recess does not constitute a passage opening. Preferably, the entrance of the transverse bolt recess in the form of a blind hole is arranged at an outer surface of the rotor blade. It is alternatively preferable for the transverse bolt recess to be formed as a passage opening, in particular as a passage bore. Orthogonally with respect to the central axis of the transverse bolt recess, the latter preferably has a circular cross section. Circular cross sections have the advantage that they can be formed particularly easily. Further cross sections of the transverse bolt recess are however possible, with in particular angular and/or slot-like and/or oval cross sections being possible here.

A transverse bolt is arranged in the transverse bolt recess. The transverse bolt likewise has a central axis, wherein the cross section orthogonally with respect to said central axis preferably has the same cross section, in terms of shape, as the transverse bolt recess. For example, the transverse bolt has a circular cross section if the transverse bolt recess likewise has a circular cross section. Furthermore, the transverse bolt is designed such that it can be arranged in the transverse bolt recess. This relates in particular to extents of the transverse bolt orthogonally with respect to the central axis, because these extents must preferably be smaller than the extents of the transverse bolt recess in each case in the same direction. In the case of a preferred circular embodiment of the transverse bolt recess and of the transverse bolt, the diameter of the transverse bolt is designed to be smaller than the diameter of the transverse bolt recess. In a further preferred embodiment of the transverse bolt recess and of the transverse bolt, the diameter of the transverse bolt is formed so as to be substantially equal to the diameter of the transverse bolt recess.

The transverse bolt is preferably composed of a metallic material, in particular a steel, or comprises such material. In particular, high-strength materials, such as for example high-strength steels or nonferrous metals, are preferred here for the transverse bolt. Furthermore, the transverse bolt may also comprise or be composed of further materials, such as for example plastics or ceramics. Furthermore, the transverse bolt has a transverse bolt opening which is arranged radially with respect to its central axis. The transverse bolt opening is formed either as a blind hole or as a passage opening. The transverse bolt opening preferably comprises an internal thread.

The longitudinal bolt recess extending substantially parallel to the longitudinal axis of the rotor blade is thus preferably arranged substantially orthogonally with respect to the transverse bolt recess. The longitudinal bolt recess has a face-side end and a face-side-averted end. The longitudinal bolt recess extends between said two ends, wherein, orthogonally with respect to said longitudinal extent, there is preferably formed a cross section which is circular. Further cross sections, as have been discussed above with regard to the transverse bolt recess, are also possible here. The longitudinal bolt recess extends in the longitudinal direction of the rotor blade so as to reach as far as the face-side-facing wall of the transverse bolt recess. Furthermore, the longitudinal bolt recess and the transverse bolt recess are arranged so as to have a common passage. The longitudinal bolt recess thus extends as far as the transverse bolt recess.

A longitudinal bolt guided into the longitudinal bolt recess can thus be arranged with a first section within the longitudinal bolt recess and with a second section within the transverse bolt recess. The longitudinal bolt is likewise preferably composed of a metallic material, preferably a steel, or comprises such a material. In particular, high-strength materials, such as for example high-strength steels or nonferrous metals, are preferred here for the longitudinal bolt. the longitudinal bolt may also comprise or be composed of further materials, such as for example plastics or ceramics.

The transverse bolt opening of the transverse bolt is preferably designed such that the longitudinal bolt can be arranged, preferably with the second section, within the transverse bolt opening. This additionally relates to the position of the transverse bolt and the position of the transverse bolt opening in the transverse bolt, because the transverse bolt opening can preferably be arranged so as to be oriented coaxially with respect to the longitudinal bolt recess. It is preferable if the longitudinal bolt and the transverse bolt opening each have a circular cross section with respect to their respective central axis. In this preferred variant, the longitudinal bolt has a smaller diameter than the transverse bolt opening in order that the longitudinal bolt can be arranged within the transverse bolt opening or at least partially led through said transverse bolt opening. It is particularly preferable for there to be an external thread in the second section of the longitudinal bolt and an internal thread within the transverse bolt opening, such that the longitudinal bolt can be fastened in the transverse bolt opening by means of a screw connection. A further advantageous refinement provides for the longitudinal bolt to be formed as a threaded bolt. A threaded bolt of said type has a thread over a predominant part along its main direction of extent. It is furthermore preferable for the thread to extend substantially entirely from a first end to a second end of the longitudinal bolt formed as a threaded bolt.

The invention is based inter alia on the realization that the abovementioned arrangement of the longitudinal bolt in the transverse bolt opening is possible only if the transverse bolt opening is arranged substantially coaxially with respect to the longitudinal bolt recess and thus coaxially with respect to the longitudinal bolt. Furthermore, the invention is based on the realization that the normally large dimensions of the longitudinal bolt and/or of the transverse bolt can lead to damage to the rotor blade. Such damage is caused for example by contact pressures which exceed an admissible contact pressure of the material surrounding the longitudinal bolt and/or transverse bolt recess. Furthermore, notch effects may arise, which arise for example as a result of a tilting and/or pivoting of the longitudinal bolt within the longitudinal bolt recess, for which reason an exact orientation and/or centering and/or positioning of the longitudinal bolt within the longitudinal bolt recess and/or within the transverse bolt opening is generally necessary.

Notch effects and inadmissible contact pressures can lead to material damage, wherein instances of delamination may also arise in the case of fiber composite materials. In particular in the root region or in the region of the face surfaces at which the rotor blade is fastened to a rotor hub and high forces, for example the centrifugal forces of the entire rotor blade, act, material damage may result for example in adverse effects on the integrity, service life or maintenance cycles of the rotor. Furthermore, the notch effect may also lead to damage to and/or fatigue of the longitudinal bolt, which may as a result exhibit lower static and/or dynamic strength. Furthermore, the durability of the longitudinal bolt may be reduced. Furthermore, the use of additional auxiliary elements, which are generally used for the insertion and/or adjustment of the longitudinal bolt, can be dispensed with. In particular, it is possible to dispense with the use of an auxiliary element designed as an adjustment plate.

To counteract these disadvantages, a sleeve is arranged in the longitudinal bolt recess, such that the longitudinal bolt extends through a cavity of the sleeve. By means of the sleeve, tilting and/or jamming can be reduced or prevented, such that the notch effects and/or inadmissible contact pressures can be correspondingly reduced or avoided. Furthermore, there is the possibility of decoupling of the longitudinal bolt from the transverse bolt.

The sleeve is in particular designed such that the longitudinal bolt is guided substantially coaxially with respect to the longitudinal bolt recess. The sleeve therefore preferably has a cavity which, orthogonally with respect to the longitudinal extent of the sleeve, has a cross section which substantially corresponds to the shape of the cross section of the longitudinal bolt. Furthermore, the inner diameter of the cavity or the dimension within said cavity is preferably smaller than the outer diameter or the outer dimensions of the longitudinal bolt. The outer diameter of the sleeve is furthermore preferably smaller than or equal to the diameter of the longitudinal bolt recess.

The sleeve is preferably a tubular element with a tubular geometry. The sleeve may alternatively preferably also have a box-shaped geometry with a rectangular or some other angular cross section. Furthermore, aside from a circular cross section, the cavity may likewise have one or more angular, preferably polygonal cross sections. The sleeve is furthermore preferably substantially open at its two face sides, such that an entry into and/or an exit out of the cavity of the sleeve is possible here. Radially with respect to its longitudinal extent, the sleeve has for example a closed encompassing wall. It is alternatively preferable for said radial encompassing wall to not be completely closed, such that the encompassing wall has for example openings, and/or the encompassing wall is formed as a lattice structure. The sleeve may also be formed from multiple parts, for example may be split parallel with respect to the longitudinal extent.

In particular, it is preferable for the sleeve to have a passage axis and a radial encompassing wall with an outer circumferential surface, wherein at least one web is arranged on the outer circumferential surface and extends with its main direction of extent substantially parallel to the passage axis of the sleeve. The at least one web may extend from a first sleeve end to a second sleeve end. The at least one web may also extend only over one or more sections of the longitudinal extent of the sleeve, and/or have interruptions. The at least one web preferably has a height in a radial direction of the sleeve, and furthermore preferably a thickness orthogonally with respect to the radial direction and orthogonally with respect to the main direction of extent, wherein the thickness is preferably oriented substantially parallel to a tangential direction of the outer circumferential surface.

A preferred development of the sleeve furthermore provides that the at least one web has a tapering section in a section adjoining the first sleeve end and/or adjoining the second sleeve end, wherein the height of the at least one web is reduced in the region of the tapering section. It is preferable for two or more webs to be arranged on the outer circumferential surface of the radial encompassing wall of the sleeve and to extend with their respective main direction of extent substantially parallel to the passage axis of the sleeve. The webs are preferably distributed equidistantly over the outer circumferential surface of the sleeve. It is furthermore preferable for the sleeve to have an even number of webs, with in each case two being arranged diametrically with respect to one another. In particular, it is preferable for six webs to be arranged on the outer circumferential surface, with in particular in each case two webs being arranged diametrically.

The webs of a sleeve of said type permit a particularly advantageous fit of the sleeve within the longitudinal bolt recess. In particular, a sleeve with one, two or more webs can be arranged in the longitudinal bolt recess with little effort. Furthermore, the sleeve exhibits a secure seat owing to the web or the webs.

The material of the sleeve may preferably be selected so as to have elastic characteristics. In particular, it is preferable for the material of the sleeve to be more elastic than the material of the longitudinal bolt and/or than the material surrounding the longitudinal bolt recess. An elastic material of the sleeve can be advantageously utilized to the effect that the sleeve is inserted with a certain force into the longitudinal bolt recess, and is fixed at a position owing to the elastic characteristics. A subsequent insertion of the longitudinal bolt inter alia through the cavity of the sleeve could thus lead to no displacement or a reduced displacement of the sleeve within the longitudinal bolt recess. It is furthermore preferably possible for the sleeve to be arranged on the longitudinal bolt such that the longitudinal bolt with the sleeve can subsequently be arranged inter alia in the longitudinal bolt opening.

The sleeve may be composed of, or comprise, a plastic and/or a metal and/or a nonferrous metal and/or a wood and/or a ceramic and/or a glass. In particular, it is preferable for the sleeve to be composed of or comprise a foam. As foam, use may for example be made of polyvinyl chloride (PVC), polyurethane or polyethylene terephthalate (PET). It is furthermore possible for the sleeve to have positioning elements, such as for example hooks, on an outer circumferential surface. Said positioning elements may inter alia improve the positioning of the sleeve within the longitudinal bolt recess.

In a preferred design variant of the rotor, provision is made for the longitudinal bolt to project with at least one hub fastening section out of the rotor blade at a face side and to be connected to a preferably T-shaped and/or L-shaped encircling rotor hub flange, which itself is arranged preferably in integral fashion on the rotor hub. The longitudinal bolt is in particular connected by way of its face-side-averted end to the transverse bolt or fastened in some other way in a region adjoining the transverse bolt. The hub fastening section is arranged in a region adjoining the face-side-facing end of the longitudinal bolt. The hub fastening section of the longitudinal bolt, which in this design variant projects out of the rotor blade at a face side, is furthermore connected to the rotor hub flange.

A fastening of the rotor blade to a rotor hub can thus be ensured. For such a connection, in a further design variant, provision may preferably be made for the hub fastening section to have an external thread and for the rotor hub flange to have a passage opening for arrangement coaxially with respect to the longitudinal bolt, wherein the longitudinal bolt can be led through said passage opening and is, on a rotor-blade-averted side of the rotor hub flange of the hub fastening section, fixed by means of a fastening element to an internal thread, preferably of a nut. Here, the connection between the rotor hub flange and the rotor blade is preferably achieved by means of a screw connection.

In a particularly preferred design variant of the rotor, provision is made for the at least one rotor blade to comprise multiple longitudinal bolt recesses and/or multiple transverse bolt recesses and/or multiple longitudinal bolts and/or multiple transverse bolts with in each case at least one transverse bolt opening and/or multiple sleeves, which are in each case arranged in accordance with one of the design variants described above. The longitudinal bolt recesses preferably have the same spacing from the longitudinal axis of the rotor blade and/or are furthermore distributed preferably equidistantly on the circumference of the face surface.

The longitudinal bolt recesses are preferably arranged pairwise in parallel with respect to one another and in two substantially mutually concentrically arranged rows. It is alternatively preferable for the longitudinal bolt recesses of one row to be arranged relative to the longitudinal bolt recesses of the other row. In the case of the preferred provision of only one row of longitudinal bolt recesses along the face side of the rotor blade, the number of transverse bolt recesses is preferably equal to the number of longitudinal bolt recesses. In the case of the provision of a second row of longitudinal bolt recesses, the number of transverse bolt recesses may be half of the number of longitudinal bolt recesses, because a transverse bolt can be arranged in a transverse bolt recess and can has a total of two transverse bolt openings, such that two longitudinal bolts, which are arranged in each case in two longitudinal bolt recesses, can in turn be arranged in a single transverse bolt with a total of two transverse bolt openings.

In a further particularly preferred design variant of the rotor, provision is made for the sleeve to be composed of a plastic or to comprise a plastic. In particular, a thermoplastic material is preferred here. Furthermore, the sleeve may be composed of or comprise an elastomer. Elastomers, also referred to colloquially as rubber, generally have strongly elastic characteristics. In a further design variant, the sleeve may comprise or be composed of a fiber-reinforced plastic, which comprises for example short fibers. A further advantageous embodiment provides for the sleeve to be composed of or to comprise a metallic material, in particular a non-hardened metallic material. Preferably, the sleeve is composed of aluminum or of an aluminum alloy, or the sleeve comprises aluminum or an aluminum alloy.

In a further preferred design variant, provision is made for the sleeve to extend from a first sleeve end to a second sleeve end, comprising a first sleeve section, adjoining the first sleeve end, with a first outer diameter and comprising a second sleeve section, adjoining the second sleeve end, with a second outer diameter. In one design variant, the first outer diameter has the same dimension as the second outer diameter. In this design variant, the sleeve preferably has no significant shoulder or the like on its outer circumferential surface. In this design variant, a sleeve section or a region of a sleeve section may be arranged in the transverse bolt opening, such that the transverse bolt can be fixed in a position by the sleeve. This fixing may simplify an insertion of the transverse bolt into the transverse bolt openings. The central axis of the longitudinal bolt and the central axis of the sleeve and/or the central axis of the longitudinal bolt recess are, in this design variant, arranged substantially coaxially with respect to one another. In particular, the transverse bolt fixing known in the prior art can be substituted, or at least simplified, by seating and/or adhesive bonding and/or tempering of the transverse bolt within the transverse bolt recess.

In a further design variant, the first outer diameter differs from the second outer diameter in terms of its dimensions. The abrupt change from the first outer diameter to the second outer diameter may be realized for example by means of a straight shoulder, wherein the step that is formed forms a surface which has a surface orthogonal parallel to the longitudinal extent of the sleeve. Alternatively, said shoulder or the transition from the first to the second outer diameter may be realized not abruptly but in a continuous manner, for example with a radius. Such a continuous transition may be or comprise for example a straight line and/or a curve.

In further design variants of the sleeve, said sleeve may also have three or more sections with different and/or equal outer diameters. A sleeve with different outer diameters offers various advantages. For example, it is possible for the sleeve region with a relatively small diameter to be arranged within the transverse bolt opening. The sleeve section with the relatively large outer diameter is then arranged for example in the longitudinal bolt recess. By means of such an arrangement of the sleeve or of the individual sleeve sections with different outer diameters, fixing of the sleeve in the longitudinal bolt recess can be realized. Depending on the extent to which the sleeve section with the relatively small outer diameter is inserted into the transverse bolt opening, the longitudinal bolt may either also be screwed into the transverse bolt or into a part of the transverse bolt opening, or the longitudinal bolt may lead all the way through the transverse bolt opening and be fastened to an element connected thereto. Furthermore, the different outer diameters of the sleeve may be utilized in order for the sleeve to be arranged in the longitudinal bolt recess in an improved manner. Furthermore, the arrangement of the longitudinal bolt within the cavity of the sleeve can be improved by means of different outer diameters.

In a further particularly preferred design variant of the rotor, provision is made for at least one internal thread to be arranged in the cavity of the sleeve, wherein the internal thread is preferably arranged in a section which adjoins the first sleeve end and/or the second sleeve end. The internal thread may for example extend all the way from the first sleeve end to the second sleeve end. It is on the other hand also possible for the internal thread to be arranged only in sections within the cavity of the sleeve. In particular, it is preferable for the internal thread to be arranged in regions which adjoin the first and/or second sleeve end.

It is particularly preferable if, at the first and/or second end, there is arranged an internal thread which, in the longitudinal direction, has an extent of less than 20% of the total longitudinal extent of the sleeve. It is furthermore possible for said extent to correspond to less than 15%, preferably less than 10%, in particular less than 5%, of the longitudinal extent of the sleeve. Aside from further advantages of an internal thread within a cavity of the sleeve, it is in particular possible for the sleeve to be fixed to the longitudinal bolt, preferably already before the arrangement of the longitudinal bolt in the longitudinal bolt recess, such that no further longitudinal displacement, or at least reduced longitudinal displacement, of the sleeve on the longitudinal bolt is possible. It is thus possible to prevent the sleeve from assuming a disadvantageous position. In particular, it may be possible to prevent the sleeve from projecting out of the rotor blade at a face side.

In a further preferred design variant of the rotor, provision is made for the sleeve to extend substantially from a face-side-facing end to a face-side-averted end of the longitudinal bolt recess, and/or for the sleeve to adjoin the face side of the rotor blade and/or a face-side-facing end of the longitudinal bolt recess and/or a face-side-averted end of the longitudinal bolt recess. Thus, the sleeve extends preferably from the face-side-facing end to the transverse bolt recess. The sleeve is preferably arranged entirely in the longitudinal bolt opening. In particular, it is preferable for the sleeve not to project out of the longitudinal bolt opening, such that said sleeve is arranged at least flush in the longitudinal bolt opening.

In this design variant, it is furthermore the case that the longitudinal bolt within the longitudinal bolt recess is substantially entirely surrounded in the radial direction by the sleeve. This means in particular that the sleeve is arranged between the longitudinal bolt and a wall of the longitudinal bolt recess. This also applies to sleeves which do not have a closed encompassing wall, but rather have for example openings and/or holes or other structures, for example lattice meshes, such that the sleeve does not fully surround the longitudinal bolt in a radial direction or in encircling fashion. In the case of sleeves with such a non-closed encompassing wall, the complete surrounding of the longitudinal bolt thus relates to an envelope surface or lateral surface of the sleeve.

In a further design variant of the rotor, provision is made for the sleeve to have a spacing from the face side of the rotor blade and/or from a face-side-facing end of the longitudinal bolt recess and/or from a face-side-averted end of the longitudinal bolt recess, and for said spacing to be 0 to 25% of an extent of the longitudinal bolt recess and/or of an overall extent of the longitudinal bolt recess and transverse bolt opening. The extent of the longitudinal bolt recess is substantially identical to or parallel to the longitudinal axis of the rotor blade. It is particularly preferable if the spacing from the face-side-facing and/or from the face-side-averted end of the longitudinal bolt recess is less than 20% of the extent of the longitudinal bolt recess, preferably less than 15% of the extent of the longitudinal bolt recess, in particular less than 10% of the extent of the longitudinal bolt recess, for example less than 5% of the extent of the longitudinal bolt recess.

In this design variant, the sleeve preferably does not extend all the way from the face-side-facing end to the face-side-averted end of the longitudinal bolt recess. Rather, the sleeve is spaced apart from one of said ends, wherein the spacing preferably amounts to 0 to 25% of the longitudinal bolt recess extent. The sleeve preferably does not project out of the longitudinal bolt opening. The spacing of the sleeve to the face-side-facing end and the spacing to the face-side-averted end may have the same dimension or a different dimension. For example, it is possible for the sleeve to be spaced apart from the face-side-facing end by only 5% of the extent of the longitudinal bolt recess, but to be spaced apart from the face-side-averted end by 25% of the extent of the longitudinal bolt recess. It is furthermore also possible for the spacing to the two abovementioned ends of the longitudinal bolt recess to be equal. A variable spacing to the two abovementioned ends of the longitudinal bolt opening is also possible. The sleeve may be arranged in the longitudinal bolt recess so as to be displaceable in the longitudinal direction.

In a further design variant of the rotor, provision is made for the sleeve to have a spacing from the face side of the rotor blade and/or from a face-side-facing end of the longitudinal bolt recess and/or from a face-side-averted end of the longitudinal bolt recess, and for said spacing to be greater than 25% of an extent of the longitudinal bolt recess and/or of a total extent of longitudinal bolt recess and transverse bolt opening.

In a further preferred design variant of the rotor, provision is made for the sleeve to adjoin the face side of the rotor blade and/or a face-side-facing end of the longitudinal bolt recess and/or a face-side-averted end of the longitudinal bolt recess. In this design variant, it is preferable for no significant spacing of the sleeve from the face-side-facing end of the longitudinal bolt recess and/or from the face-side-averted end of the longitudinal bolt recess to be provided.

In a further particularly preferred design variant of the rotor, provision is made for the sleeve to be arranged between the face side of the rotor blade and/or a face-side-facing end of the longitudinal bolt recess and a face-side-averted end of the longitudinal bolt recess. The extent between the face-side-facing end of the longitudinal bolt recess and the face-side-averted end of the longitudinal bolt recess is substantially parallel to the longitudinal extent of the rotor blade.

In a further preferred design variant of the rotor, provision is made for the sleeve to be at least in two parts in the longitudinal direction. The parting plane preferably extends from the first sleeve end to the second sleeve end. In the case of a two-part embodiment, the sleeve thus preferably comprises two halves of a tube, which each make up a 180-degree partial tube segment. If the sleeve is arranged in the longitudinal bolt recess, the longitudinal direction of the sleeve substantially identical to or parallel to the longitudinal axis of the rotor blade.

Such a sleeve can be produced particularly inexpensively because, for example in an injection molding process, no cores need to be provided. The connection of these two sleeve parts may be realized for example by means of at least one O-ring.

In a further design variant of the rotor, provision is made whereby the has at least one rib which is arranged preferably in the cavity and/or on an inner circumferential surface and/or in a radially encircling fashion. Such a rib or two or more such ribs in the cavity of a sleeve can increase the strength of the sleeve by means of a stiffening effect. In a preferred design variant, the sleeve is of flexibly soft form. Furthermore, the ribs arranged in the cavity of the sleeve can be utilized for the fixing of the sleeve to a longitudinal bolt. In a preferred refinement of the sleeve with three or more ribs within the cavity of the sleeve, it is furthermore preferable for the ribs to be spaced apart from one another equidistantly. In a further design variant, the sleeve, either exclusively or in addition to the ribs in the cavity of the sleeve, comprises ribs on an outer circumferential surface, which in addition to the stiffening effect permits fixing of the sleeve, in particular within the longitudinal bolt recess.

In a further particularly preferred design variant of the rotor, provision is made for a section of the sleeve to be arranged in the transverse bolt opening, wherein said section preferably has an outer diameter equal to, greater than or smaller than that of other sections of the sleeve. In this design variant, the sleeve may preferably be arranged in the longitudinal bolt recess such that a region of the sleeve extends into the transverse bolt opening. If the transverse bolt opening has a diameter smaller than an outer diameter of a sleeve section that is not arranged in the transverse bolt opening, it is furthermore possible here to utilize the shoulder formed between the relatively small and relatively large diameters as a stop. It is thus possible by means of said stop for the position of the sleeve in the longitudinal bolt recess or in the transverse bolt opening to be defined, and/or for the sleeve to be fixed, for example by means of an interference fit.

In a further preferred design variant of the rotor, the rotor comprises an expansion sleeve recess which is arranged on the face-side-averted side of the transverse bolt and which extends substantially parallel to the longitudinal axis of the rotor blade and coaxially with respect to the longitudinal bolt recess and in which an expansion sleeve is arranged, and/or the first and/or second sleeve section is arranged within the transverse bolt opening, wherein said section preferably has an outer diameter equal to or greater than or smaller than that of other sleeve sections.

The longitudinal bolt can thus extend through the transverse bolt opening, and impinges on the expansion sleeve on the face-side-averted side of the transverse bolt. The expansion sleeve is preferably arranged and designed such that the longitudinal bolt can be fastened therein. In this design variant, it is particularly preferable for an above-described sleeve with a first and a second outer diameter to be arranged, wherein the first and the second outer diameter have different dimensions. The section with the relatively small outer diameter can in this case be inserted into the transverse bolt opening such that the transverse bolt is fixed. A longitudinal bolt can now be led through the sleeve and thus also through the longitudinal bolt opening in order to pass to the expansion sleeve, where said longitudinal bolt can be fastened.

In a further design variant, provision is made for the transverse bolt recess to be designed as a blind hole and/or as a passage opening.

According to a further aspect of the invention, provided is a rotor blade for a wind power installation, which rotor blade extends from a blade root to a blade tip in a longitudinal direction, wherein the blade root is designed for the fastening of the rotor blade to a rotor hub, having a rotor blade inner part which comprises the blade root and having a rotor blade outer part which comprises the blade tip, wherein the rotor blade inner part and the rotor blade outer part are connected to one another in a connecting region, wherein the rotor blade inner part and/or the rotor blade outer part comprises, in the connecting region, a transverse bolt recess which extends substantially radially with respect to the longitudinal axis of the rotor blade and in which a transverse bolt is arranged, wherein the transverse bolt has a transverse bolt opening radially with respect to its longitudinal axis, a longitudinal bolt recess which extends substantially parallel to the longitudinal axis of the rotor blade and which extends from a first end at the face side of the rotor blade to a second end at the transverse bolt recess, wherein the longitudinal bolt recess and the transverse bolt recess and/or transverse bolt opening have a common passage, a sleeve is arranged in the longitudinal bolt recess, wherein a longitudinal bolt extends through a cavity of the sleeve, and the longitudinal bolt is arranged with a section within the transverse bolt opening.

Here, the connection, already described in the first aspect of the invention, of a rotor blade to a rotor hub is used to connect a rotor blade inner part and a rotor blade outer part to one another. Since the connection of a rotor blade inner part to a rotor blade outer part is preferably likewise realized with a longitudinal bolt and a transverse bolt with corresponding recesses, a sleeve is provided in the longitudinal bolt recess in this case too, such that the design variants and advantages already described above can also be utilized here.

In a further preferred design variant of the rotor blade, provision is made for the longitudinal bolt to project with at least one fastening section out of the rotor blade outer part at a face side and to be connected to a preferably T-shaped and/or L-shaped encircling rotor blade inner part flange which itself is arranged, preferably integrally, on the rotor blade inner part. The rotor blade inner part flange may preferably be formed from steel or have steel. In a further preferred design variant of the rotor blade, provision is made for the longitudinal bolt to project with at least one fastening section out of the rotor blade inner part at a face side and to be connected to a preferably T-shaped encircling rotor blade outer part flange which itself is arranged, preferably integrally, on the rotor blade outer part.

In a further design variant of the rotor blade, provision is made for the fastening section to comprise an external thread and for the rotor blade inner part flange to have a passage opening for arrangement coaxially with respect to the longitudinal bolt, wherein the longitudinal bolt can be led through said passage opening and, on a side of the rotor blade inner part flange averted from the rotor blade outer part, the fastening section is fixed by means of a fastening element to an internal thread, preferably of a nut. In a further design variant of the rotor blade, provision is made for the fastening section to comprise an external thread and for the rotor blade outer part flange to have a passage opening for arrangement coaxially with respect to the longitudinal bolt, wherein the longitudinal bolt can be led through the passage opening and, on a side of the rotor blade outer part flange averted from the rotor blade inner part, the fastening section is fixed by means of a fastening element to an internal thread, preferably of a nut.

According to a further aspect of the invention, provided is a rotor according to at least one of the design variants mentioned above comprising a rotor blade according to at least one of the design variants mentioned above. The rotor thus comprises a connection of the rotor blade to the rotor hub as mentioned above, and a rotor blade which comprises a rotor blade inner part and a rotor blade outer part which are preferably designed in accordance with the previous aspect.

According to a further aspect of the present invention, provided is a sleeve for the alignment of a longitudinal bolt and/or of a transverse bolt within a longitudinal bolt recess and/or a transverse bolt recess of a rotor according to one of the design variants described above and/or of a rotor blade according to at least one of the design variants described above.

According to a further aspect of the present invention, provided is a wind power installation comprising at least one rotor according to at least one of the design variants described above and/or at least one rotor blade according to at least one of the design variants described above.

According to a further aspect of the present invention, provided is a method for the assembly of a rotor according to at least one of the design variants described above and/or of a rotor blade according to at least one of the design variants described above, comprising the steps of arranging the transverse bolt within the transverse bolt recess, and/or arranging the sleeve and/or the longitudinal bolt within the longitudinal bolt recess, wherein the longitudinal bolt is arranged within the cavity of the sleeve, wherein a section of the longitudinal bolt is arranged within the transverse bolt recess. Preferably, for this purpose, the elements of a rotor according to at least one of the design variants described above and/or of a rotor blade according to at least one of the design variants described above are provided for the assembly.

The sleeve may initially be separately introduced into the longitudinal bolt recess, with a longitudinal bolt thereupon subsequently being arranged in the longitudinal bolt recess, in particular such that the longitudinal bolt is arranged through the cavity of the sleeve.

It is furthermore possible for the longitudinal bolt to firstly be arranged with a section in the cavity of the sleeve, with the assembly composed of longitudinal bolt and sleeve subsequently being arranged in the longitudinal bolt recess. The arrangement of the longitudinal bolt within the transverse bolt opening is preferably performed such that the longitudinal bolt is fastened within the transverse bolt opening. This may for example by means of an internal thread in the transverse bolt opening and a corresponding external thread on the corresponding section of the longitudinal bolt. It is furthermore possible for the longitudinal bolt to project through the transverse bolt opening and, where it emerges from the transverse bolt opening, to be fastened in turn to a further element, for example an expansion sleeve.

In a further preferred design variant of the method, provision is made for the hub fastening section of the longitudinal bolt to comprise an external thread and for the rotor hub flange to have a passage opening for arrangement coaxially with respect to the longitudinal bolt, wherein the longitudinal bolt is led through said passage opening and is fixed, on a side of the flange of the hub fastening section averted from the rotor blade, by means of a fastening element to an internal thread, preferably of a nut. Here, the connection of the rotor blade to the rotor hub is thus realized by means of a screw connection, which is realized in particular by means of the face-side fastening of the rotor blade to a hub-side flange.

In a further design variant of the method, said method comprises the step of fastening the longitudinal bolt within the transverse bolt opening, wherein the fastening is realized preferably by means of a screw connection, such that, preferably, the transverse bolt opening has an internal thread and the longitudinal bolt preferably has an external thread. The longitudinal bolt is thus fixed to the rotor blade in the longitudinal direction of the rotor blade.

In a further design variant of the method, said method comprises the steps of arranging an expansion sleeve within an expansion sleeve recess, wherein the expansion sleeve recess is arranged on a face-side-averted side of the transverse bolt opening, leading a longitudinal bolt through the transverse bolt opening, and connecting the longitudinal bolt to the expansion sleeve. Here, the transverse bolt serves not primarily for the fastening of the longitudinal bolt but rather merely for the leadthrough of the longitudinal bolt to the expansion sleeve. The expansion sleeve is preferably a tubular element, wherein said element particularly preferably has an internal thread which is formed correspondingly to an external thread of the longitudinal bolt at its face-side-averted end.

The method according to the invention and its possible developments have features or method steps which makes them suitable in particular for being used for a rotor according to the invention and/or a rotor blade according to the invention and the developments thereof. For further advantages, design variants and design details of these further aspects and of the possible developments thereof, reference is also made to the above description relating to the corresponding features and developments of the rotor.

BRIEF DESCRIPTION OF THE SEVERAL VIEWS OF THE DRAWINGS

Preferred embodiments of the invention will be discussed by way of example on the basis of the appended figures, in which.

DETAILED DESCRIPTION

In the figures, identical or substantially functionally identical or similar elements are denoted by the same reference designations.

Figure 1:
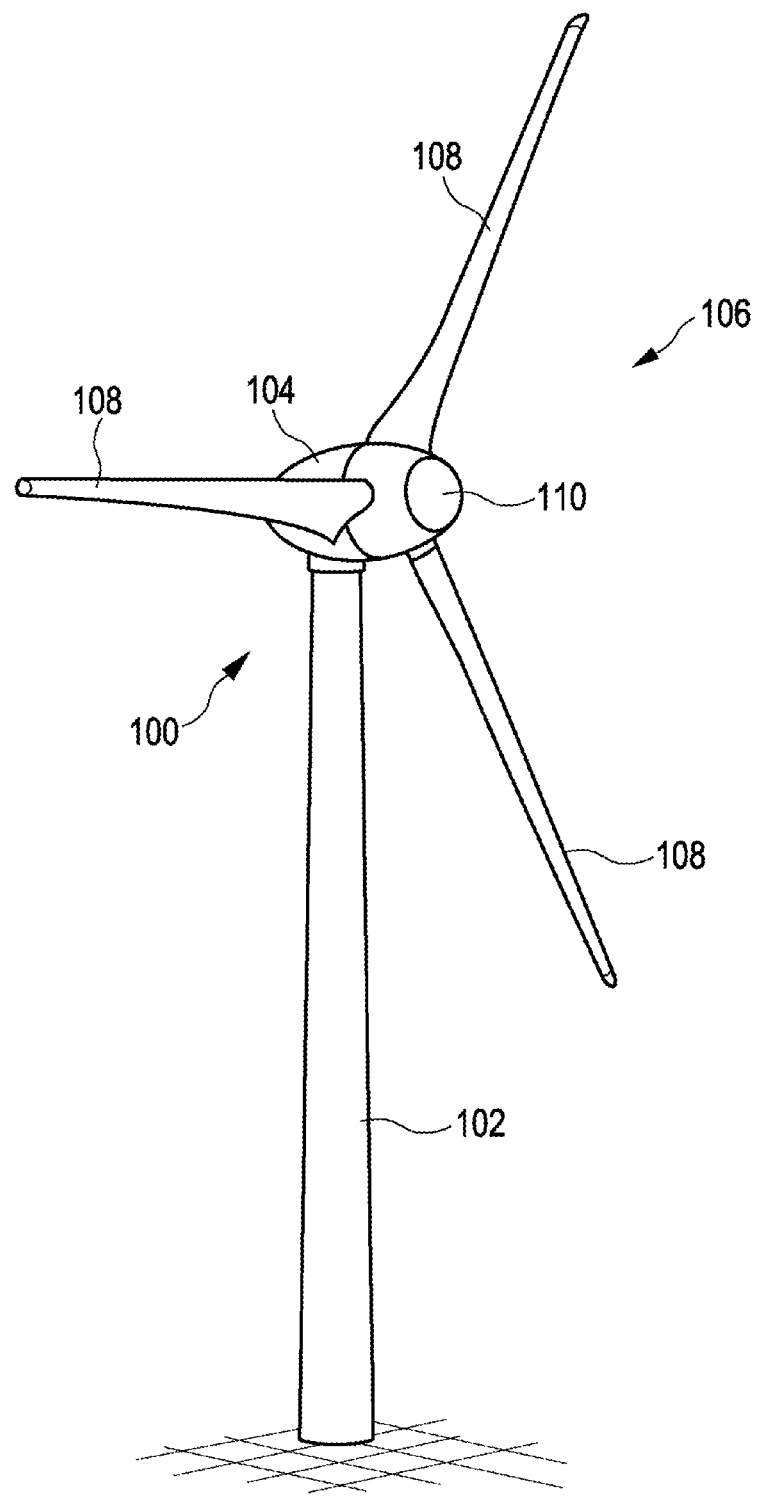
FIG. 1 shows a schematic view of an exemplary embodiment of a wind power installation.

FIG. 1 shows a schematic view of an exemplary embodiment of a wind power installation. FIG. 1 shows in particular a wind power installation 100 with a tower 102 and with a nacelle 104. On the nacelle 104, there is arranged a rotor 106 with three rotor blades 108 and with a spinner 110. During operation, the rotor 106 is set in rotational motion by the wind, and thus drives a generator in the nacelle 104.

Figure 2:
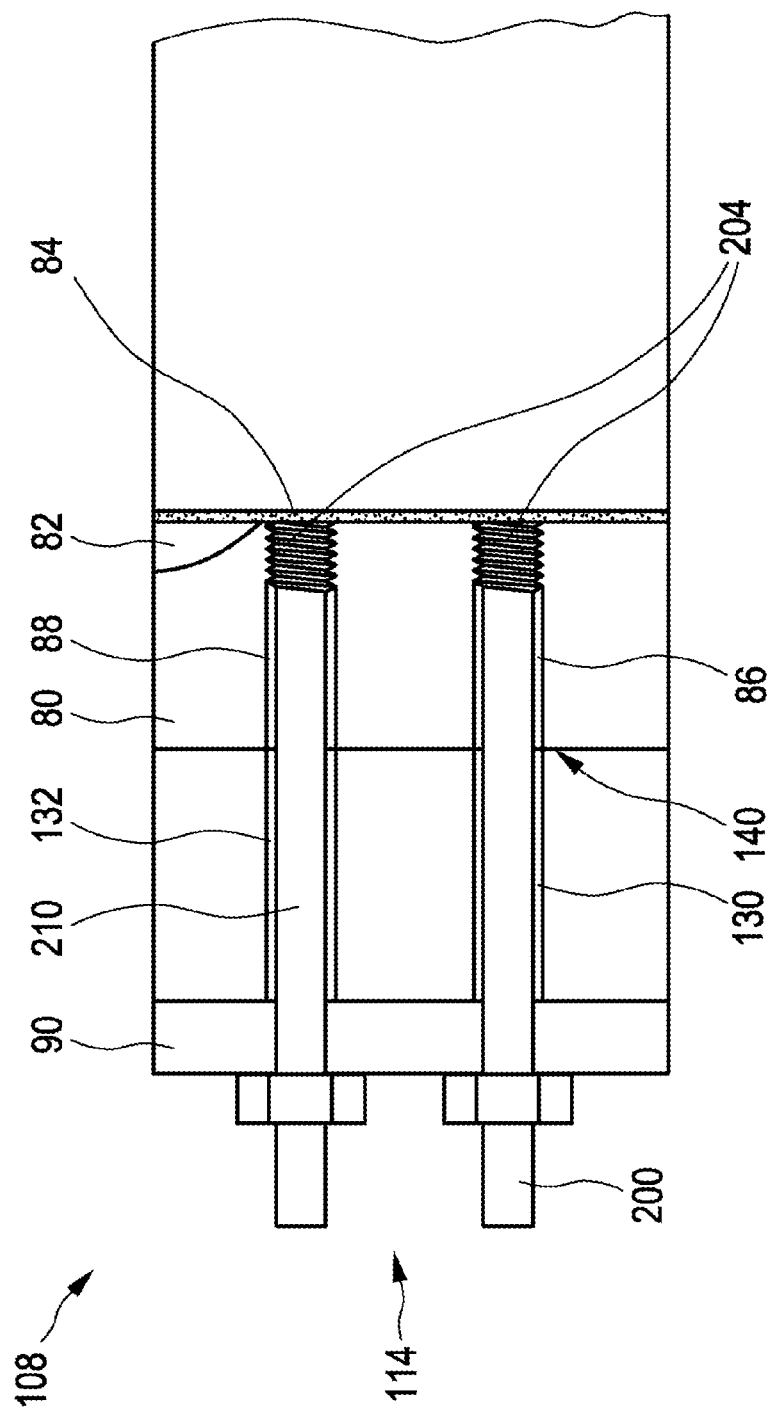
FIG. 2 shows a schematic view of an exemplary embodiment of a blade connection known in the prior art.

FIG. 2 shows a schematic view of an exemplary embodiment of a blade connection known in the prior art. The blade 108 extends in a longitudinal direction from a proximal blade end 114 to a distal end (not shown here), wherein a blade tip comprises the distal end. The blade 108 is illustrated in a sectional view, such that, here, an inner view of the wall that forms the blade, orthogonally with respect to the longitudinal extent of the blade 108, is shown. From the proximal blade end 114, a first longitudinal bolt recess 130 and a second longitudinal bolt recess 132 extend so as to be oriented substantially in the longitudinal direction of the blade. Orthogonally with respect to the longitudinal bolt recesses 130, 132, a transverse bolt recess 140 is arranged radially with respect to the longitudinal axis of the blade. The longitudinal bolt recesses 130, 132 and the transverse bolt recess 140 are in particular arranged such that those ends of the longitudinal bolt recesses 130, 132 which are averted from the proximal blade end 114 are arranged at the transverse bolt recess 140, such that the in each case one longitudinal bolt recess 130, 132 and the transverse bolt recess 140 have a common passage, which preferably leads from the proximal blade end 114 to a lateral surface of the rotor blade at which the inlet into the transverse bolt recess 140 is arranged.

A transverse bolt 80 is arranged in the transverse bolt recess 140. The transverse bolt 80 furthermore has two transverse bolt openings 86, 88, which are arranged parallel to the longitudinal axis of the rotor blade and radially with respect to the central axis of the transverse bolt 80. The first transverse bolt opening 86 is arranged coaxially with respect to the first longitudinal bolt recess 130. The second transverse bolt opening 88 is arranged coaxially with respect to the second longitudinal bolt recess 132. Furthermore, the transverse bolt openings 86, 88 each have an internal thread 204, which is arranged at that end of the transverse bolt opening which is averted from the proximal blade end 114.

Within the first longitudinal bolt recess 130 and within the first transverse bolt opening 86, there is arranged a first longitudinal bolt 200. Within the second longitudinal bolt recess 132 and within the second transverse bolt opening 88, there is arranged a second longitudinal bolt 210. The longitudinal bolts 200, 210 each have, at one end thereof, a thread by means of which they can be screwed into the threads 204 of the transverse bolt openings 86, 88. Thus, a fastening of the longitudinal bolts 200, 210 to the transverse bolt 80 can be realized. For the correct orientation and/or positioning of the longitudinal bolts 200, 210 in the longitudinal bolt recesses 130, 132 and/or in the transverse bolt openings 86, 88, an alignment plate 90 is generally used in the prior art. The alignment plate 90 is preferably a ring-shaped element which is composed of steel or comprises steel and which is arranged at a face side of the proximal end 114. As will be explained below, an auxiliary element such as this alignment plate is no longer necessary according to the invention, in particular through the use of a sleeve.

On the transverse bolt 80, there is arranged at least one recess 82. Said recess 82 is arranged on the transverse bolt 80 such that the transverse bolt 80 can be adhesively bonded to the blade 108, in particular within the transverse bolt recess 140. This adhesive bond 84 serves in particular for the fixing of the transverse bolt 80 within the transverse bolt recess 140. This arrangement known in the prior art has the disadvantage in particular that a longitudinal bolt inserted into the longitudinal bolt recess is generally not or insufficiently vertically guided. The longitudinal bolt 200, 210 can thus tilt about a horizontal axis preferably orthogonally with respect to its longitudinal orientation. This tilting can, in particular at the proximal blade end 114, lead to notch effects and/or inadmissible contact pressures which weaken the material at this location and/or in a region surrounding this location.

Figure 3:
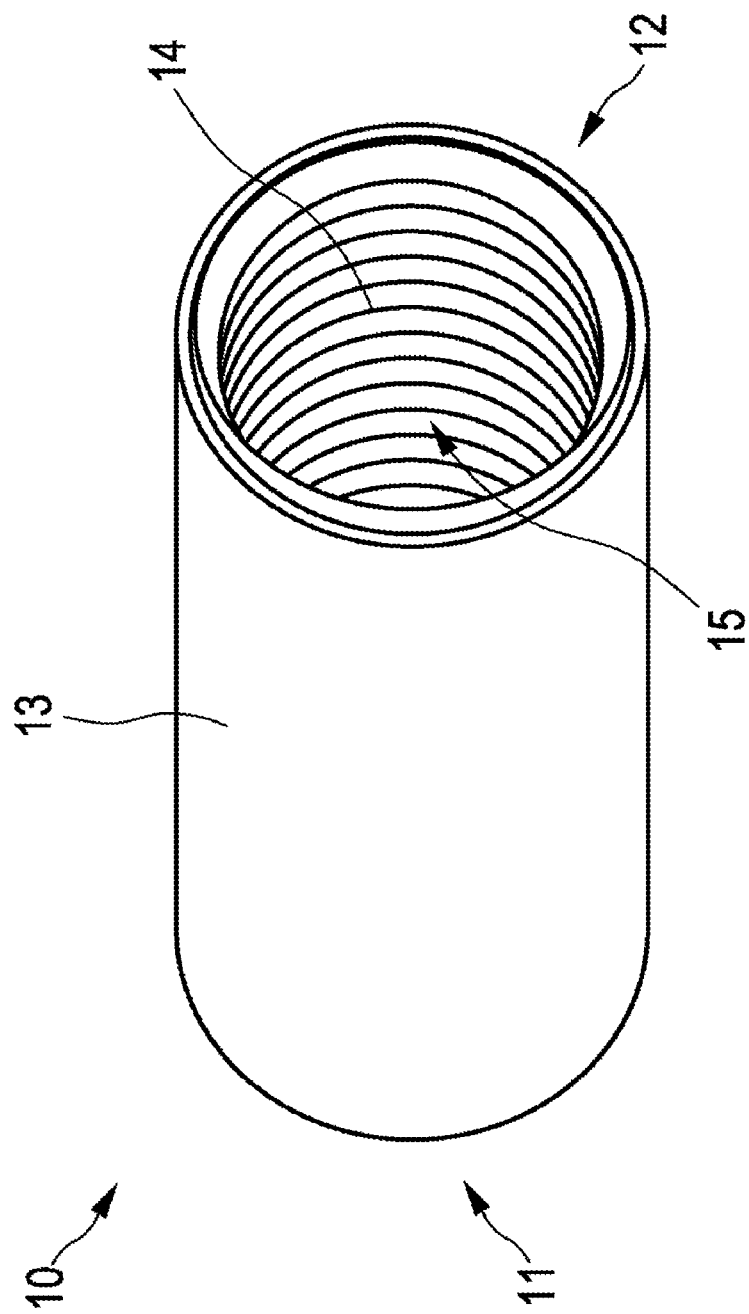
FIG. 3 shows a three-dimensional view of an exemplary embodiment of a sleeve.
Figure 4:
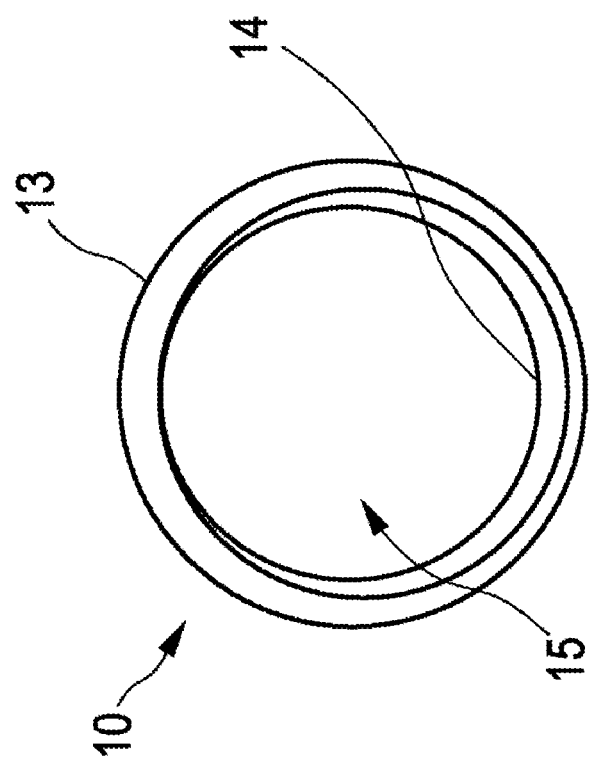
FIG. 4 shows a view in the longitudinal direction of the sleeve as per FIG. 3.
Figure 5:
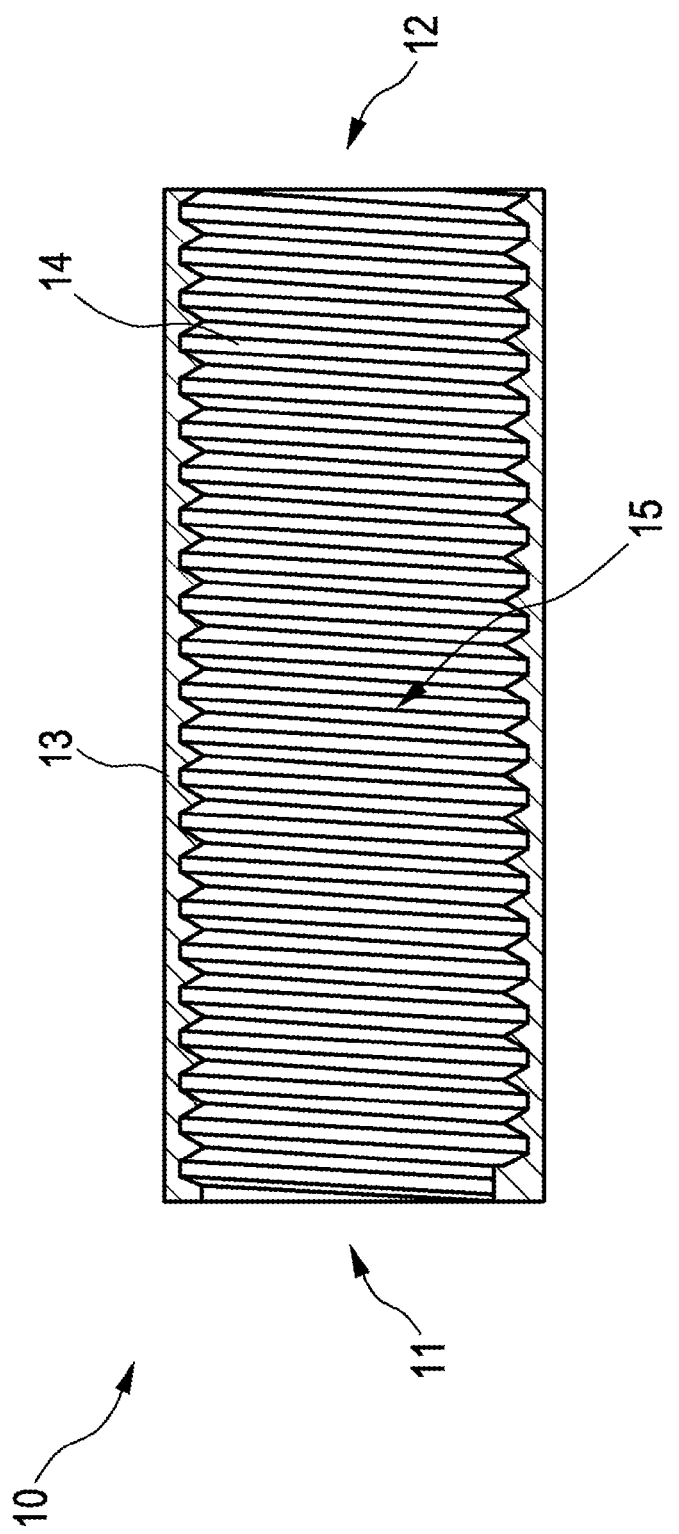
FIG. 5 shows a sectional side view of the sleeve as per FIG. 3.

FIG. 3 shows a three-dimensional view of an exemplary embodiment of a sleeve. The sleeve 10 extends in a longitudinal direction from a first sleeve end 11 to a second sleeve end 12. The sleeve 10 has a tubular geometry which surrounds a cavity 15 surrounded by a wall 13, as is also shown in FIG. 4. The inner circumferential surface, facing toward the cavity 15, of the wall 13 furthermore has a thread 14. As shown in particular in FIG. 5, said thread extends all the way along the longitudinal extent of the sleeve 10 from the first sleeve end 11 to the second sleeve end 12.

Figure 6:
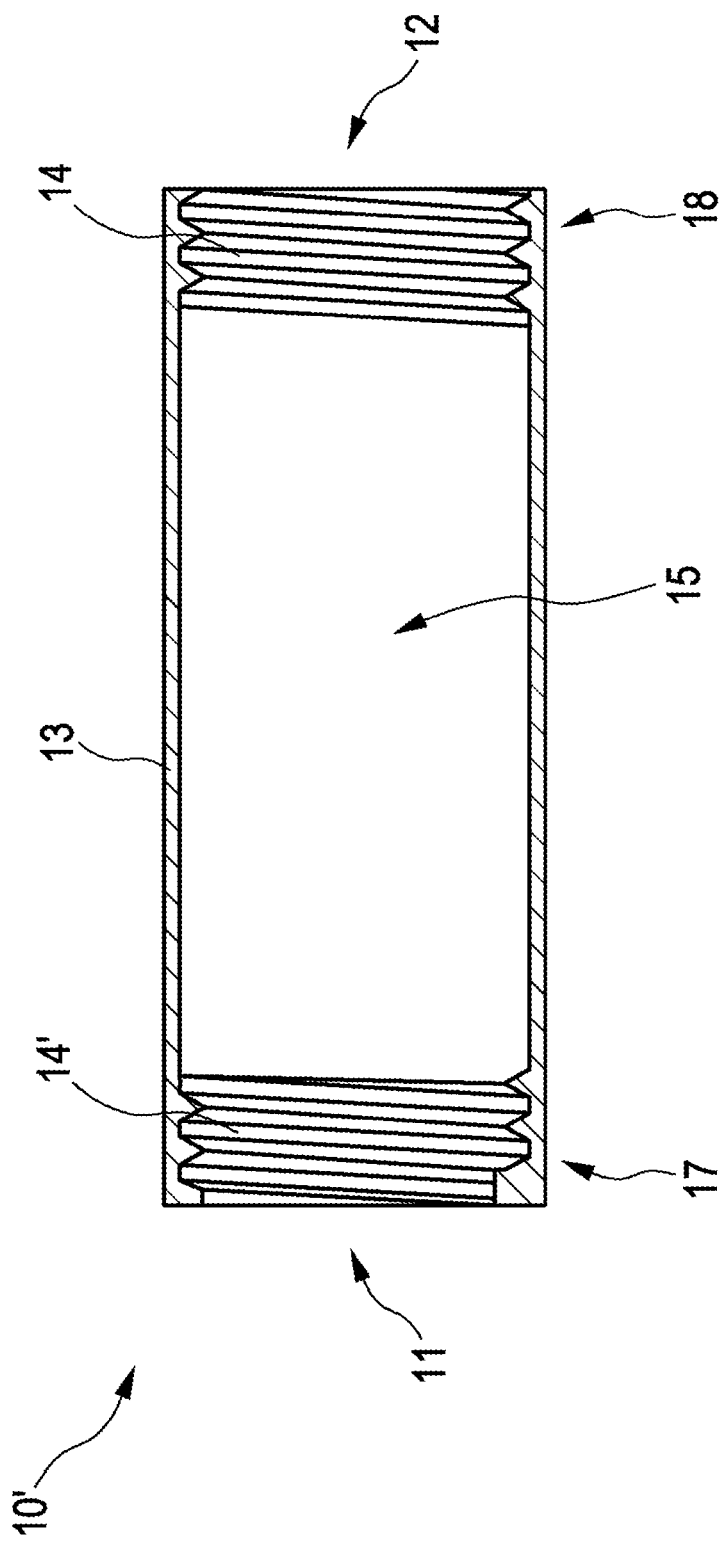
FIG. 6 shows a sectional side view of a further exemplary embodiment of a sleeve.

FIG. 6 shows a sectional side view of a further exemplary embodiment of a sleeve. The sleeve 10' differs from the above-described sleeve 10 in particular in that the thread does not extend substantially all the way from the first sleeve end 11 to the second sleeve end 12. The sleeve 10' has a thread 14' in a first thread region 17 adjoining the first sleeve end 11. Furthermore, the sleeve 10' has a thread 14 which is arranged in a second thread region 18 adjoining the second sleeve end 12. Between the first thread region 17 and the second thread region 18, no thread is arranged in the cavity, wherein the thread regions 17, 18 have a spacing. The thread regions 17, 18 each have an extent in the longitudinal direction which corresponds to approximately 10% of the total extent in the longitudinal direction of the sleeve 10'.

Figure 7:
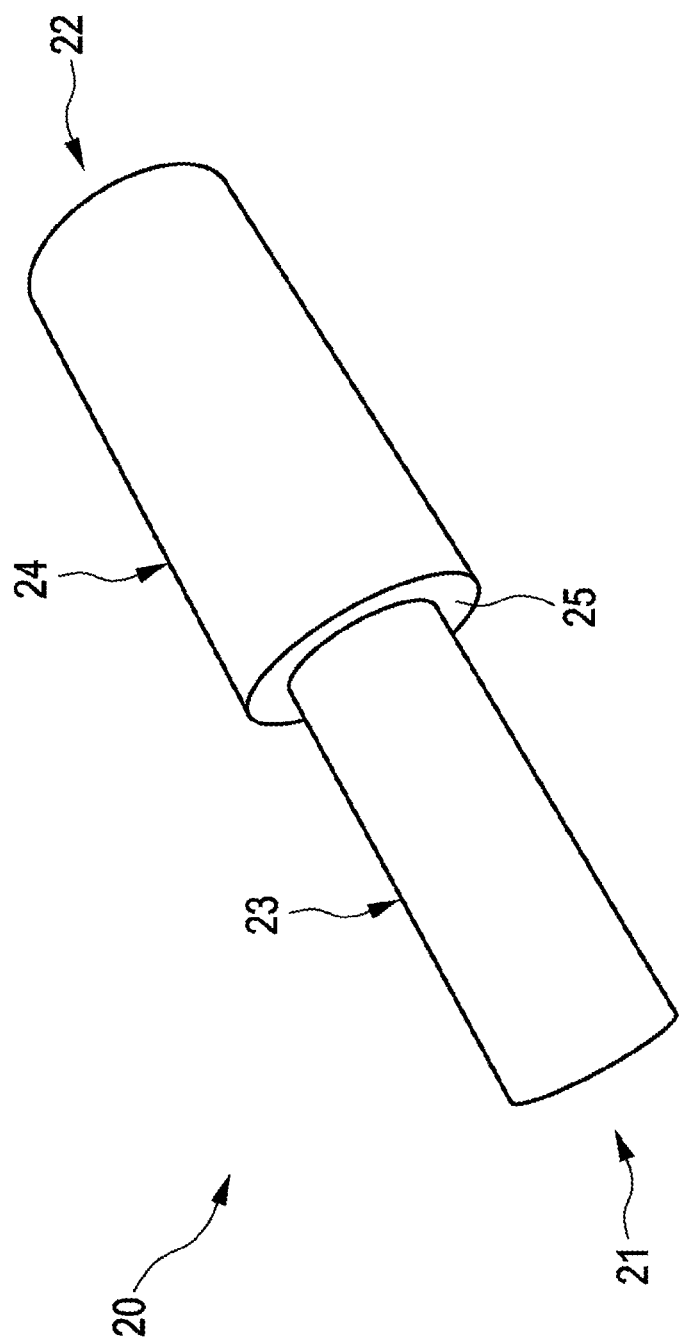
FIG. 7 shows a schematic three-dimensional view of a further exemplary embodiment of a sleeve.

FIG. 7 shows a schematic three-dimensional view of a further exemplary embodiment of a sleeve 20. The sleeve 20 extends from a first sleeve end 21 to a second sleeve end 22. Between the first sleeve end 21 and the second sleeve end 22, the sleeve 20 has, by contrast to the sleeves 10, 10' described above, a first sleeve section 23 and a second sleeve section 24. The first sleeve section 23 has substantially the same dimension in the longitudinal direction as the second sleeve section 24. The first sleeve section 23 differs from the second sleeve section 24 in particular in that the first sleeve section 23 has a smaller outer diameter than the second sleeve section 24.

Figure 8:
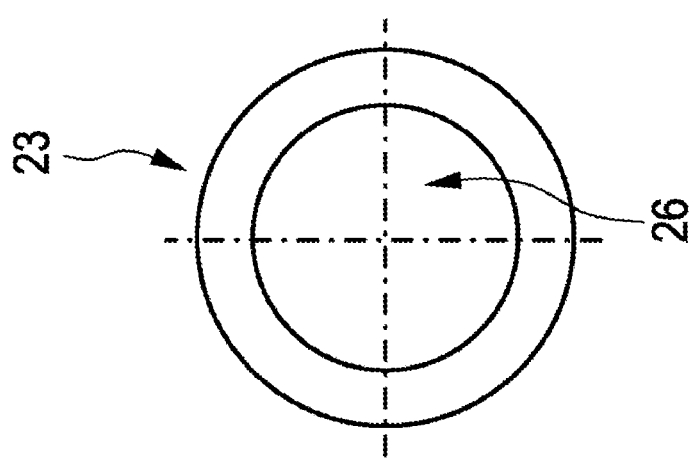
FIG. 8 shows a view in the longitudinal direction of the sleeve as per FIG. 7.
Figure 9:
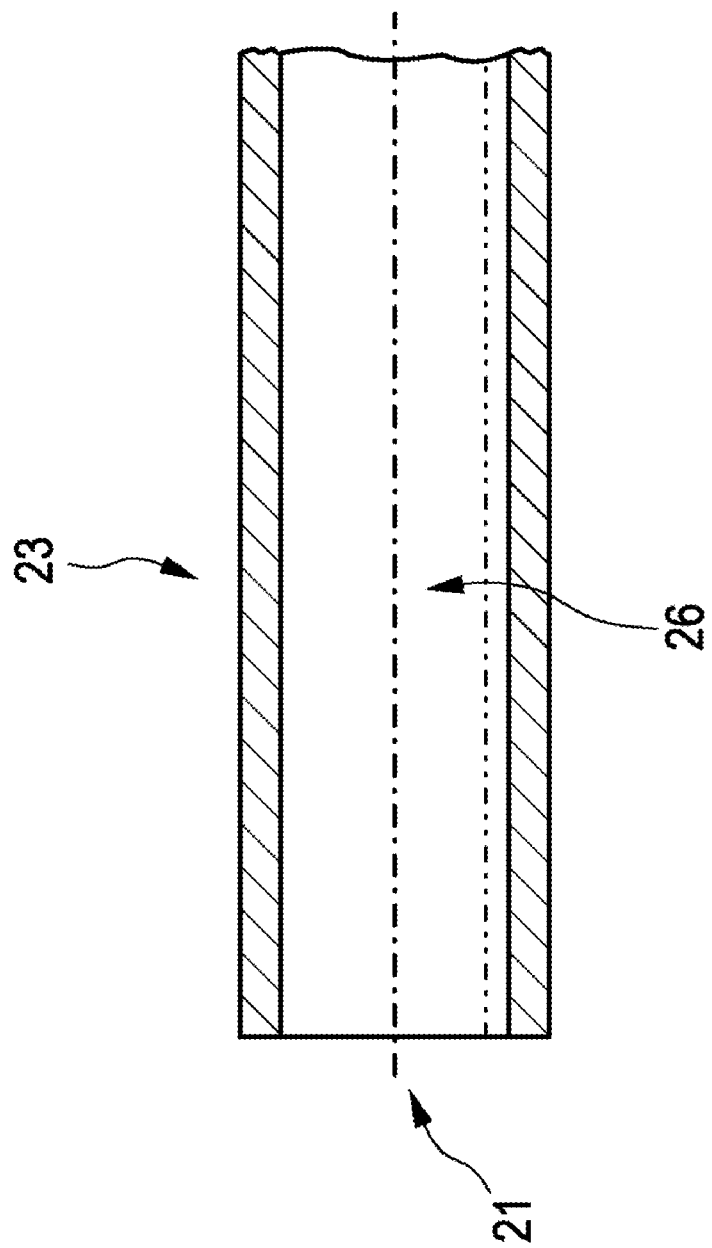
FIG. 9 shows a sectional partial side view of the sleeve as per FIG. 7.

Owing to the circular cross section orthogonally with respect to the longitudinal axis of the sleeve 20 of the first and second sleeve sections 23, 24, a shoulder 25 is formed at the transition from the first sleeve section 23 to the second sleeve section 24. Said shoulder is an abrupt shoulder, such that the shoulder 25 forms a surface, the surface orthogonal of which runs substantially parallel to the longitudinal extent of the sleeve 20. FIGS. 8 and 9 show partial views of the first sleeve section 23 in more detail. The sleeve section 23 has a cavity 26 which extends from the first sleeve end 21 to the end of the first sleeve section 23. In this exemplary embodiment, no thread is arranged within said cavity 26. The sleeve 20 shown in FIG. 7 extending from the first sleeve end 21 to the second sleeve end 22 likewise has a cavity which extends over the entire longitudinal extent of the sleeve.

Figure 10:
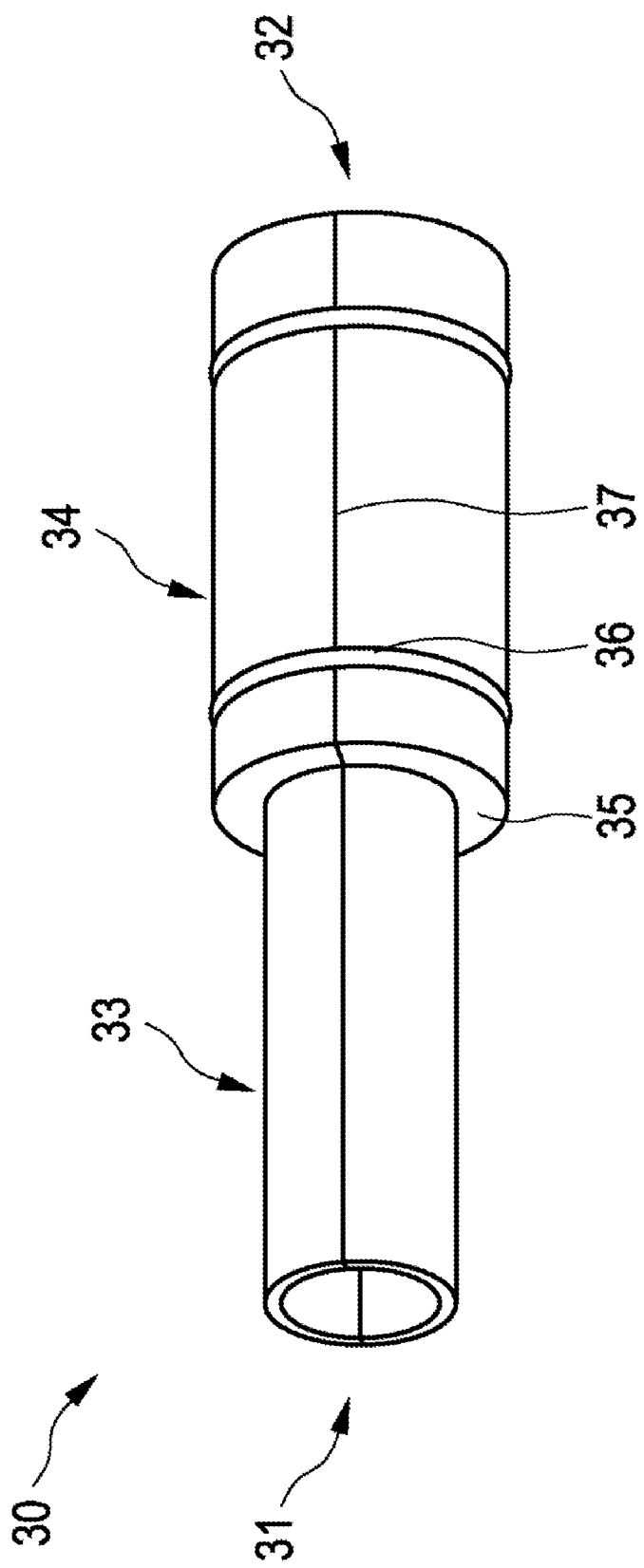
FIG. 10 shows a schematic side view of a further exemplary embodiment of a sleeve.
Figure 11:
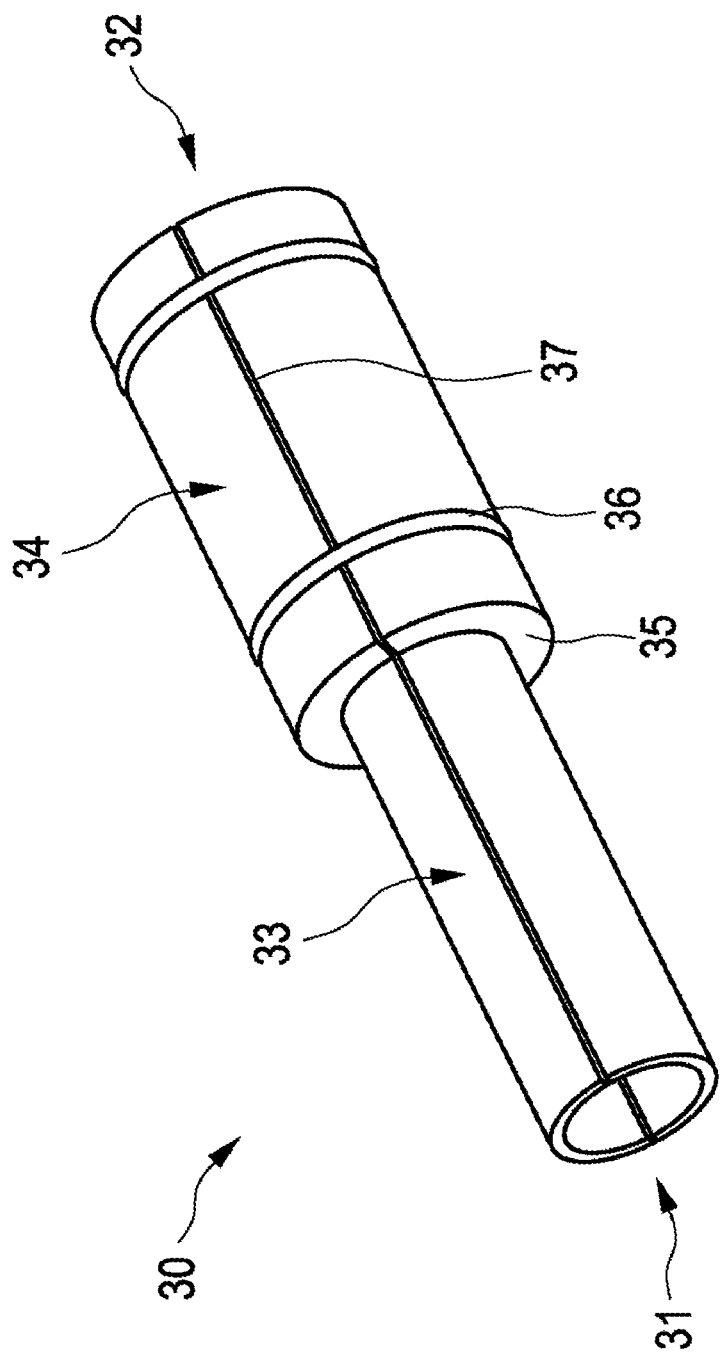
FIG. 11 shows a schematic three-dimensional view of the sleeve as per FIG. 10.
Figure 12:
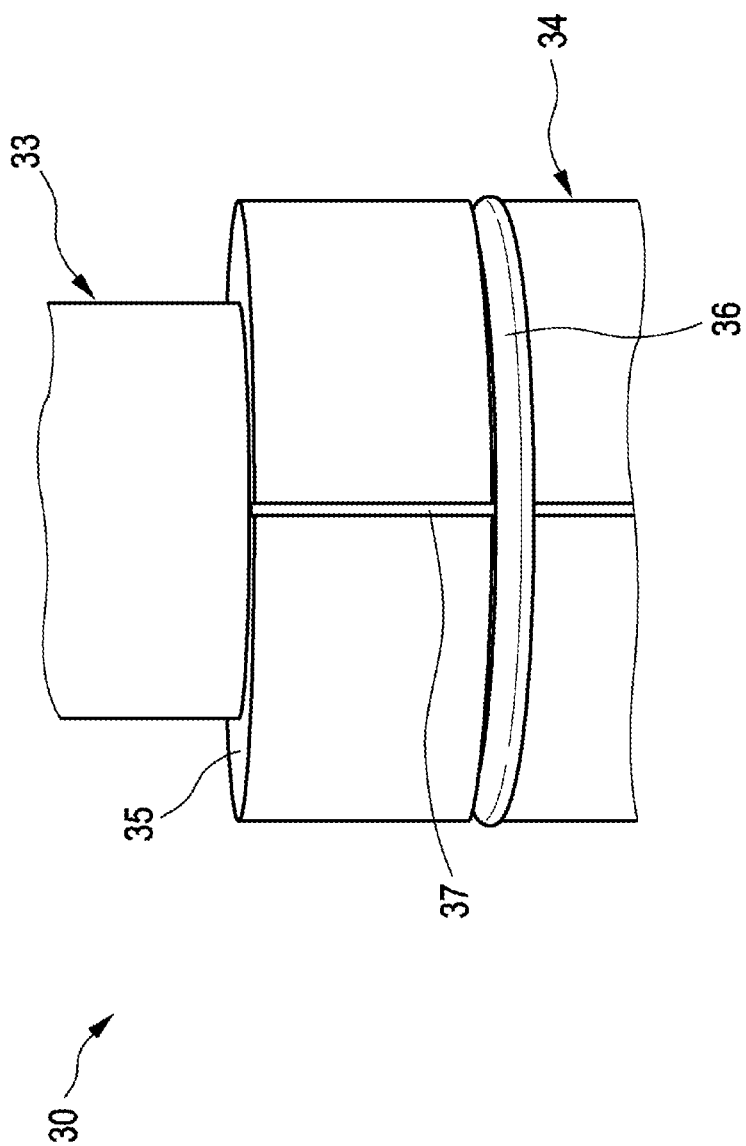
FIG. 12 shows a schematic detailed view of the sleeve as per FIG. 10.

FIG. 10 shows a schematic side view of a further exemplary embodiment of a sleeve 30. Further views of the sleeve 30 as per FIG. 10 are shown as a three-dimensional view in FIG. 11 and as a detail view in FIG. 12. The sleeve 30 likewise has an extent from a first sleeve end 31 to a second sleeve end 32, wherein the sleeve 30 likewise has a first sleeve section 33 and a second sleeve section 34. The first sleeve section 33 adjoins the first sleeve end 31, and the second sleeve section 34 adjoins the second sleeve end 32. A shoulder 35 is thus formed approximately halfway along the extent of the sleeve 30 at the transition from the first to the second sleeve end 31, 32. By contrast to the sleeve 20 described in FIGS. 7 to 9, the sleeve 30 differs in that it comprises two sleeve halves. The two sleeve halves extend from the first to the second sleeve end 31, 32 and thus form a parting joint 37 which extends from the first to the second sleeve end 31, 32.

The two sleeve halves thus have the geometry of a tube which is split in the longitudinal direction. The two sleeve halves furthermore have a mirror-symmetrical geometry, such that the width of the parting plane has the same dimension as the outer diameter of the sleeve 30. The two sleeve halves of the sleeve 30 are formed and arranged on one another such that the sleeve 30 has substantially the same outer geometry as the sleeve 20 shown in FIG. 7. In the second sleeve section 34, two radially encircling notches are arranged in the outer circumferential surface, which notches however do not extend into the cavity of the sleeve 30. Said notches are designed and arranged so as to receive an O-ring 36 which connects the two sleeve halves to one another.

Figure 13:
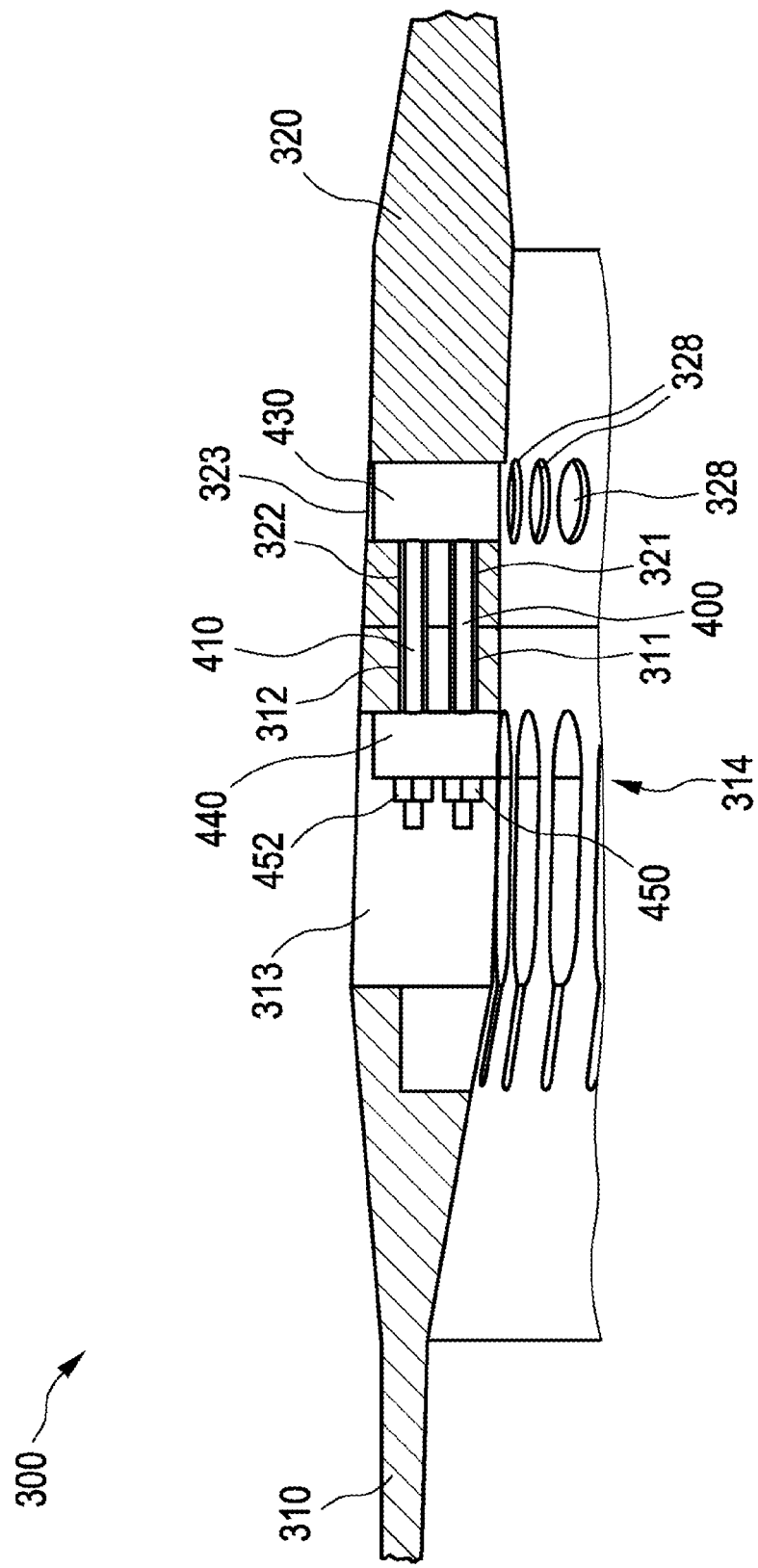
FIG. 13 shows a schematic sectional side view of an exemplary embodiment of a connecting region of a two-part rotor blade.

FIG. 13 shows a schematic sectional side view of an exemplary embodiment of a connecting region of a two-part rotor blade. The rotor blade 300 comprises, in this installed state, a rotor blade inner part 310 and a rotor blade outer part 320. The installed state shows in particular an arrangement of the rotor blade inner part 310 and of the rotor blade outer part 320 which are connected to one another by means of longitudinal bolts 400, 410 and transverse bolts 430, 440. The rotor blade inner part 310 has a flange 314 at the end facing toward the rotor blade outer part 320. On the flange 314, there is furthermore arranged a transverse bolt recess 313. The transverse bolt recess 313 is arranged radially with respect to a longitudinal axis of the rotor blade 300. In the longitudinal direction of the rotor blade 300 and thus orthogonally with respect to the transverse bolt recess 313, it is furthermore the case that a first longitudinal bolt recess 311 and a second longitudinal bolt recess 312 are arranged in the flange 314.

The rotor blade outer part 320 has a transverse bolt recess 323 which is arranged radially with respect to the longitudinal axis of the rotor blade or of the rotor blade outer part 320. Furthermore, the rotor blade outer part 320 has further transverse bolt recesses 328. Orthogonally with respect to the transverse bolt recess 323 and substantially parallel to the longitudinal extent of the rotor blade 300 or of the rotor blade outer part 320, there are arranged a first longitudinal bolt recess 321 and a second longitudinal bolt recess 322. The first longitudinal bolt recess 321 and the second longitudinal bolt recess 322 are spaced apart from one another in a radial direction of the rotor blade outer part 320. In each case one transverse bolt 430, 440 is arranged in the transverse bolt recesses 313, 323 of the rotor blade inner part 310 and of the rotor blade outer part 320. The transverse bolts 430, 440 have transverse bolt openings (not illustrated here) in which the longitudinal bolts 400, 410 can be arranged. The transverse bolt openings are, in the assembled state, arranged preferably coaxially with respect to the longitudinal bolt recesses 321, 322. In the present case, the transverse bolt 430 has an internal thread (not shown here) in the two transverse bolt openings.

The first longitudinal bolt 400 is arranged in a first transverse bolt opening, wherein the arrangement is preferably such that the transverse bolt opening has an internal thread and the longitudinal bolt 400 has an external thread corresponding thereto at the end which is arranged within the transverse bolt opening. By virtue of the first longitudinal bolt 400 being screwed into the transverse bolt opening of the transverse bolt 430, a fixed connection of the longitudinal bolt 400 to the transverse bolt 430 and thus also to the rotor blade outer part 320 is realized. The connection of the second longitudinal bolt 410 to the transverse bolt 430 is realized analogously.

The longitudinal bolts 400, 410 are arranged and designed so as to project out of the rotor blade outer part 320 or out of the longitudinal bolt recesses 321, 322 at a face side. As a result of the fact that the longitudinal bolts 400, 410 project out, these can, with corresponding arrangement of the rotor blade inner part 310, be arranged in the longitudinal bolt openings 311, 312 of the rotor blade inner part 310. Furthermore, said longitudinal bolts can be led through transverse bolt openings of the transverse bolt 440. The longitudinal bolts 400, 410 preferably also have an external thread in a region adjoining the end which is arranged within the rotor blade inner part 310.

It is furthermore preferable for the longitudinal bolts 400, 410 to project out of the transverse bolt 440 on the side averted from the rotor blade outer part 320. At this side, it is now possible for nuts 450, 452 to be screwed on to the abovementioned thread of the longitudinal bolts 400, 410. By means of this screwing-on action, a firm connection of the rotor blade inner part 310 to the rotor blade outer part 320 can be realized. The tensile forces in the longitudinal direction of the rotor blade 300 can thus be transmitted or accommodated substantially by the longitudinal bolts 400, 410.

Since the longitudinal bolts 400, 410 are preferably firstly arranged in the transverse bolt 430 of the rotor blade outer part 320, the abovementioned notch effects and/or inadmissible contact pressures may arise in the longitudinal bolt recesses 321, 322. The invention addresses this, and provides a sleeve (not shown here) in the longitudinal bolt recesses 321, 322. What is particularly preferred for this connection is a sleeve as illustrated in FIGS. 3 to 6.

Figure 14:
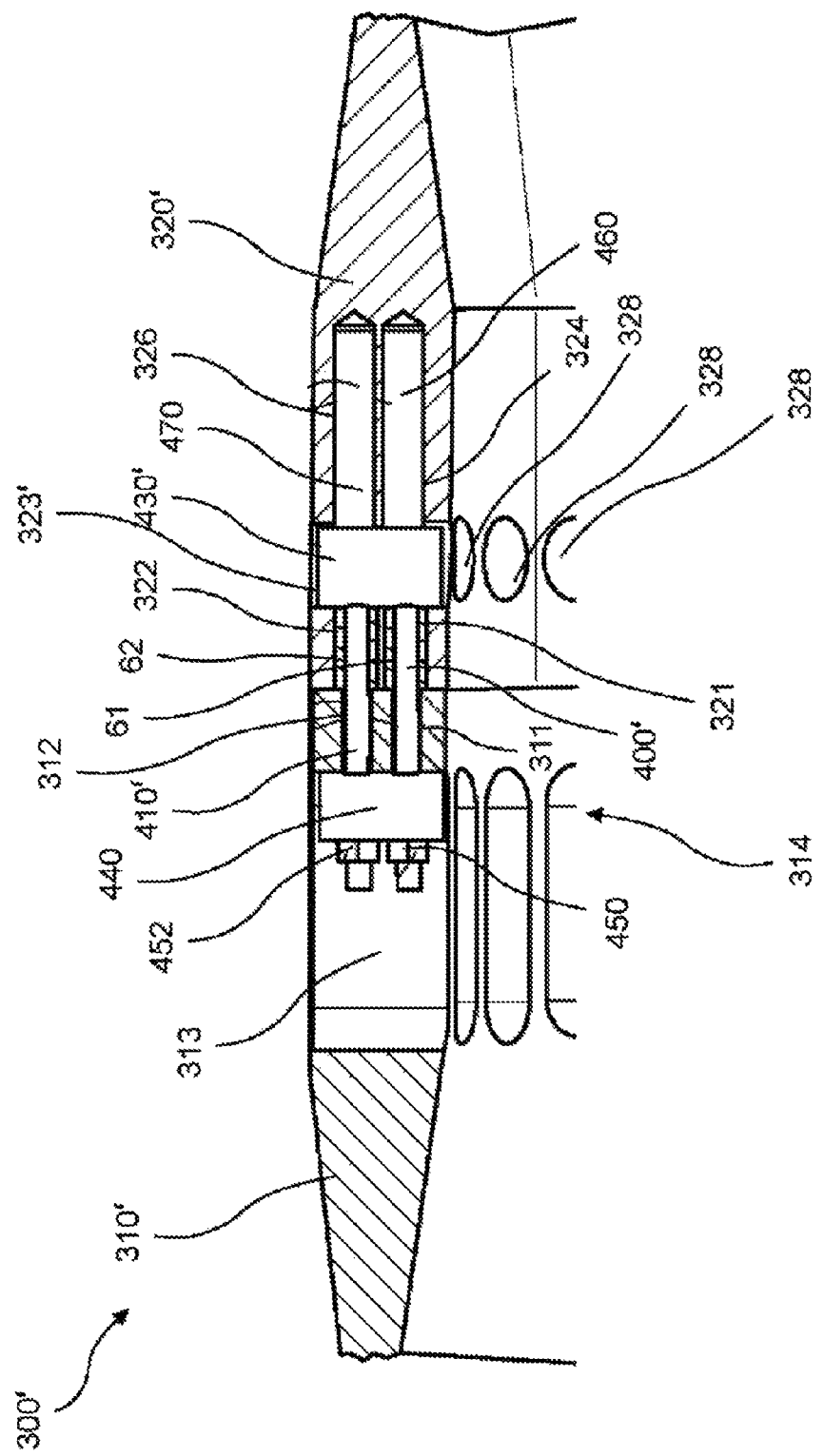
FIG. 14 shows a schematic sectional side view of a further exemplary embodiment of a connecting region of a two-part rotor blade.

FIG. 14 shows a schematic sectional side view of a further exemplary embodiment of a connecting region of a two-part rotor blade 300'. This embodiment of the rotor blade 300' in the installed state differs in particular from the above-described rotor blade 300 in that a first expansion sleeve recess 324 and a second expansion sleeve recess 326 are arranged on the rotor blade outer part 320'. The expansion sleeve recesses 324, 326 are arranged on that side of the transverse bolt 430' which is averted from the rotor blade inner part 310'. The first expansion sleeve recess 324 is arranged coaxially with respect to the first longitudinal bolt recess 321. The second expansion sleeve recess 326 is arranged coaxially with respect to the second longitudinal bolt recess 322. Within the expansion sleeve recesses 324, 326, there is furthermore arranged a first expansion sleeve 460 and second expansion sleeve 470. The transverse bolt 430' is arranged in a transverse bolt recess 323'. In this design variant, the transverse bolt 430' likewise has two transverse bolt openings; these preferably do not comprise an internal thread, such that a longitudinal bolt 400', 410' can be led through the transverse bolt 430' and can extend as far as into the expansion sleeve recesses 324, 326.

The expansion sleeves 460, 470 preferably have a tubular geometry which have an internal thread in their cavity or in the inner circumferential surface. Those ends of the longitudinal bolts which project into the expansion sleeve recesses 324, 326, or regions adjoining said ends, preferably have an external thread corresponding to the abovementioned internal thread. It is thus possible for the longitudinal bolts 400', 410' to be connected to the expansion sleeves 460, 470. A tensile force on the longitudinal bolts 400', 410' in the direction of the rotor blade inner part is thus transmitted from the expansion sleeves 460, 470 via the transverse bolt 430' into the wall of the rotor blade outer part 320'. The fastening of the ends of the longitudinal bolts 400', 410' to the rotor blade inner part 310' is performed analogously to the above-described connection to the rotor blade inner part 310 of the rotor blade 300.

A sleeve 61 is arranged in the first longitudinal bolt recess 321, and a sleeve 62 is arranged in the second longitudinal bolt recess 322. The sleeves 61, 62 are preferably either arranged in the longitudinal bolt recesses 321, 322 before the arrangement of the longitudinal bolts 400', 410' in the latter, or the sleeves 61, 62 are firstly arranged on the longitudinal bolts 400', 410', and the assembly composed of longitudinal bolt and sleeve is subsequently arranged in one of the longitudinal bolt recesses 321, 322. Aside from the sleeves shown in FIGS. 3 to 6, use may also be made here of sleeves as per FIGS. 7, 10, 11 and 12, wherein the first sleeve region 23, 33 is arranged preferably entirely or at least partially in one of the transverse bolt openings. The shoulder 25, 35 is then preferably arranged on an outer surface of the transverse bolt. It is alternatively preferable for the second sleeve region with the relatively large outer diameter to be arranged within one of the transverse bolt openings.

Figure 15:
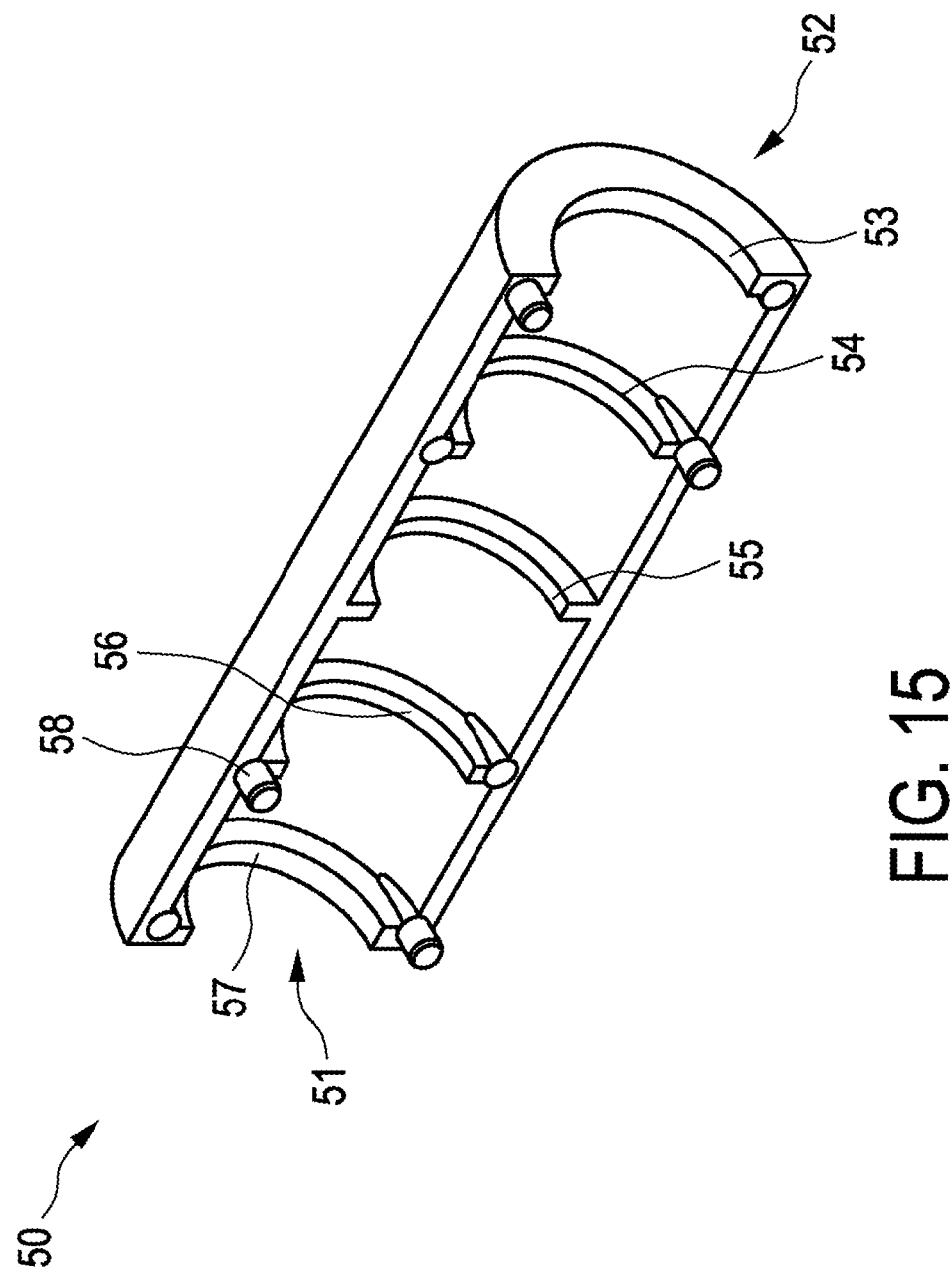
FIG. 15 shows a schematic three-dimensional view of an exemplary embodiment of a sleeve half.
Figure 16:
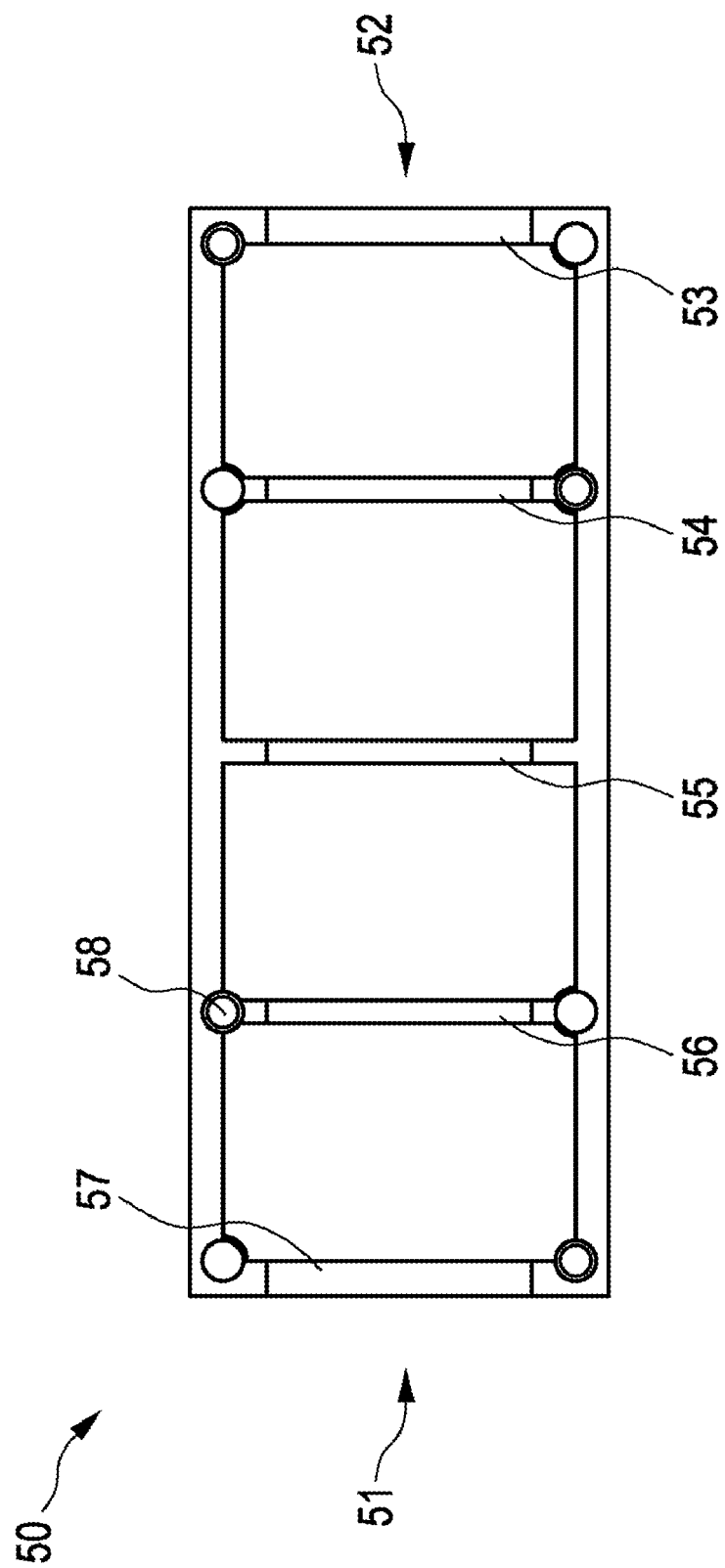
FIG. 16 shows a schematic side view of the sleeve half as per FIG. 15.
Figure 17:
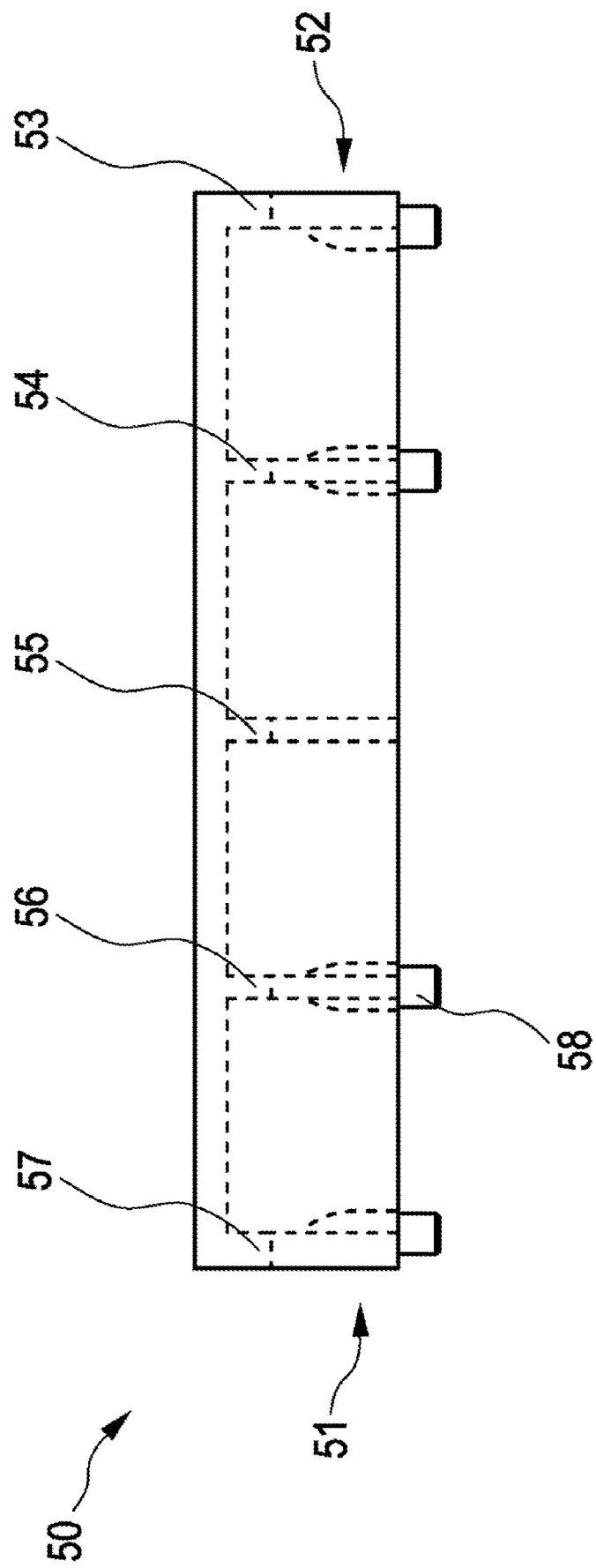
FIG. 17 shows a further schematic side view of the sleeve half as per FIG. 15.

FIG. 15 shows a schematic three-dimensional view of an exemplary embodiment of a sleeve half, wherein FIGS. 16 and 17 show further side views of said sleeve half. The sleeve half 50 extends from a first sleeve half end 51 to a second sleeve half end 52. At the first sleeve half end 51 and at the second sleeve half end 52, there is arranged in each case one rib. The rib 57 is arranged at the first sleeve half end 51, and the rib 53 is arranged at the second sleeve half end 52. Between these ribs 53, 57, there are arranged three further ribs 54, 55, 56, each with an equal spacing to one another. The ribs 53-57 increase the stiffness or strength of the sleeve, which may be advantageous in particular in the case of a two-part sleeve, which thus has relatively low mechanical strength. Furthermore, the sleeve half 50 has multiple connecting elements 58, which in this case are designed as pin elements, which can be arranged in a corresponding opening on a further sleeve half.

Figure 18:
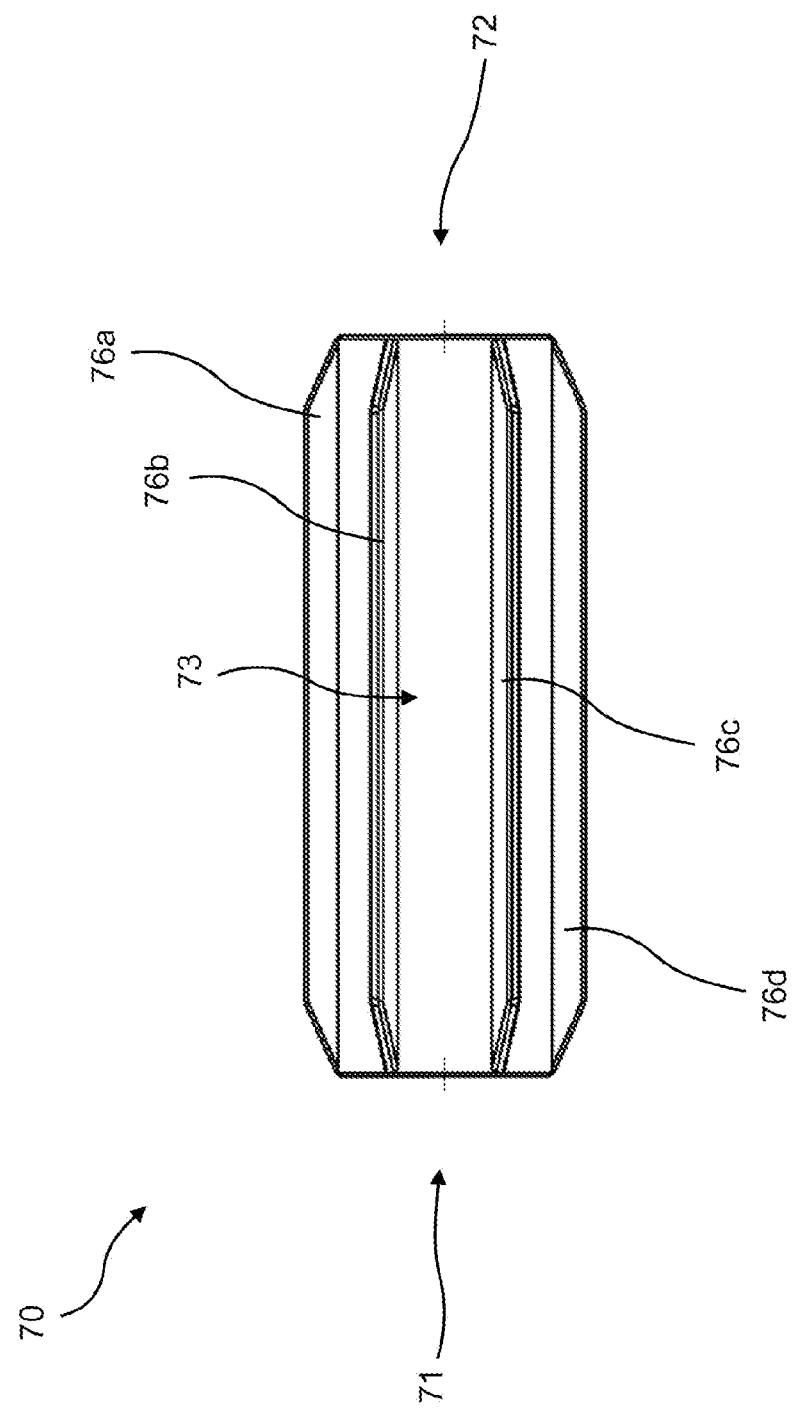
FIG. 18 shows a schematic two-dimensional side view of an exemplary embodiment of a sleeve.
Figure 19:
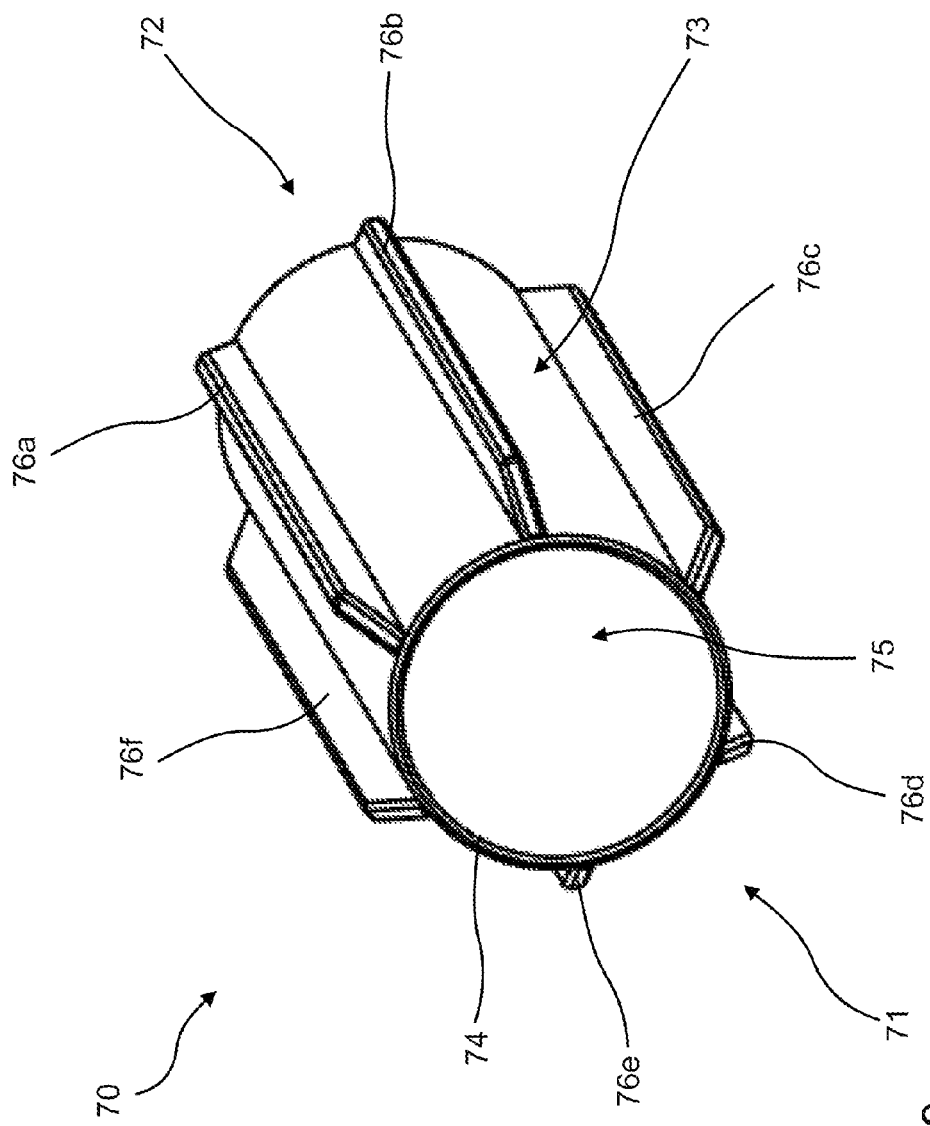
FIG. 19 shows a schematic three-dimensional view of the sleeve shown in FIG. 18.
Figure 20:
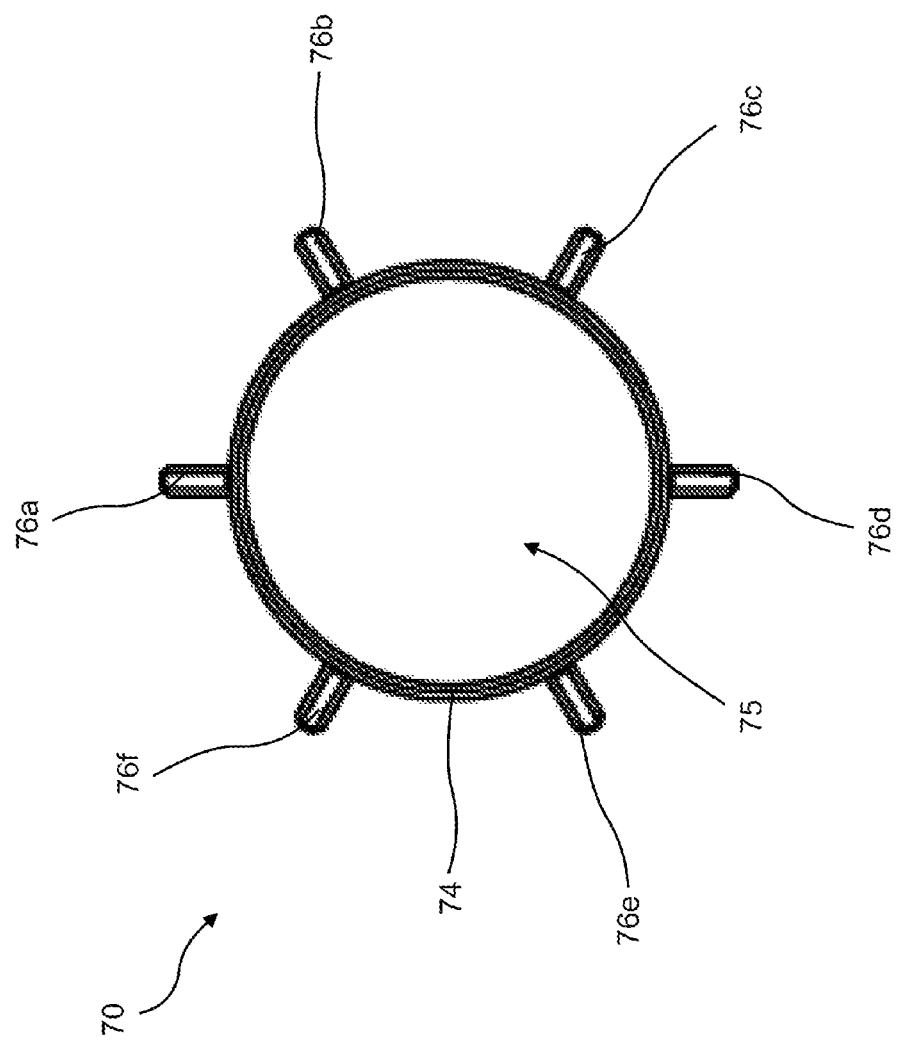
FIG. 20 shows a schematic two-dimensional front view of the sleeve shown in FIG. 18.

The sleeve 70 shown in FIGS. 18 to 20 extends in its main direction of extent from a first end 71 to a second end 72. The sleeve 70 has a radial wall 74, which radially surrounds a cavity 75. The radial wall 74 furthermore forms an outer circumferential surface 73. The outer circumferential surface 73 is to be understood in particular as a radial outer circumferential surface. The sleeve 70 furthermore has a first web 76a, a second web 76b, a third web 76c, a fourth web 76d, a fifth web 76e and a sixth web 76f. The webs 76a to 76f are arranged on the outer circumferential surface 73 of the radial encompassing wall 74 and extend with their respective main direction of extent substantially parallel to a passage axis of the sleeve. The webs 76a and 76d, and 76b and 76e, and 76c and 76f, are in each case arranged diametrically with respect to one another.

The sleeve 70 is characterized in particular by the fact that it can be arranged in a longitudinal bolt recess and, there, can be positioned particularly advantageously by means of the webs 76a to 76f. Furthermore, the sleeve 70 can, by means of the webs 76a to 76f which taper toward the first end 71 and toward the second end 72, be inserted particularly easily into a longitudinal bolt recess. The sleeve 10, 10', 20, 30, 61, 62, 70 results, owing to its arrangement in one, two or more longitudinal bolt recesses 130, 132, 321, 322, in an advantageous refinement of rotors or rotor blades. The expenditure of time for the assembly of the blade connection, in particular with regard to the arrangement and fastening of the transverse and longitudinal bolts 200, 210, 400, 400', 410, 410', 430, 430' can be greatly reduced through the provision of a sleeve 10, 10', 20, 30, 61, 62, 70 and can furthermore improve the quality of the rotor blades, in which, in particular, reduced notch effects or contact pressures occur within the longitudinal bolt recesses. In particular at the highly loaded blade connection, such improvements are advantageous, which can result inter alia in a longer service life and/or reduced maintenance cycles. Furthermore, it is thus possible for the costs of a wind power installation 100 to be reduced.

LIST OF REFERENCE DESIGNATIONS 10, 10' Sleeve
11 First sleeve end
12 Second sleeve end
13 Wall
14, 14' Internal thread
15 Cavity
17 First thread region
18 Second thread region
20 Sleeve
21 First sleeve end
22 Second sleeve end
23 First sleeve section
24 Second sleeve section
25 Shoulder
26 Cavity
30 Sleeve
31 First sleeve end
32 Second sleeve end
33 First sleeve section
34 Second sleeve section
35 Shoulder
36 O-ring
37 Parting joint
50 Sleeve
51 First sleeve half end
52 Second sleeve half end
53 Rib
54 Rib
55 Rib
56 Rib
57 Rib
58 Connecting element
61 First sleeve
62 Second sleeve
70 Sleeve
71 First sleeve end
72 Second sleeve end
73 Outer circumferential surface
74 Radial wall
75 Cavity
76a First web
76b Second web
76c Third web
76d Fourth web
76e Fifth web
76f Sixth web
80 Transverse bolt
82 Recess on the transverse bolt
84 Adhesive bond
86 First transverse bolt opening
88 Second transverse bolt opening
90 Adjustment plate
100 Wind power installation
102 Tower 104 Nacelle
106 Rotor
108 Rotor blades
110 Spinner
114 Proximal blade end
130 First longitudinal bolt recess
132 Second longitudinal bolt recess
140 Transverse bolt recess
200 First longitudinal bolt
204 External thread
210 Second longitudinal bolt
300, 300' Rotor blade
310, 310' Rotor blade inner part
311 First longitudinal bolt recess
312 Second longitudinal bolt recess
313 Transverse bolt recess
314 Flange
320, 320' Rotor blade outer part
321 First longitudinal bolt recess
322 Second longitudinal bolt recess
323, 323' Transverse bolt recess
324 First expansion sleeve recess
326 Second expansion sleeve recess
328 Transverse bolt recesses
400, 400' First longitudinal bolt
410, 410' Second longitudinal bolt
430, 430' Transverse bolt
440 Second transverse bolt
450 First nut
452 Second nut
460 First expansion sleeve
470 Second expansion sleeve

The invention claimed is:

1. A rotor for a wind power installation, comprising:
   a rotor hub; and
   at least one rotor blade coupled to the rotor hub at a connection region, wherein the connection region comprises:
   a transverse bolt recess which extends substantially radially with respect to a longitudinal axis of the at least one rotor blade;
   a transverse bolt is arranged in the transverse bolt recess, wherein the transverse bolt has a transverse bolt opening;
   a longitudinal bolt recess which extends substantially parallel to the longitudinal axis of the at least one rotor blade, wherein the longitudinal bolt recess, the transverse bolt recess, and the transverse bolt opening form a common passage, and wherein a longitudinal bolt is arranged within the longitudinal bolt recess and within the transverse bolt opening; and
   a sleeve arranged in the longitudinal bolt recess, wherein the longitudinal bolt extends through a cavity of the sleeve, wherein the sleeve extends from a first sleeve end to a second sleeve end, wherein the sleeve includes a first sleeve section at the first sleeve end having a first outer diameter, and includes a second sleeve section at the second sleeve end having a second outer diameter, wherein the second outer diameter is different from the first outer diameter.

2. The rotor as claimed in claim 1, wherein the at least one rotor blade comprises a plurality of longitudinal bolt recesses, a plurality of transverse bolt recesses, a plurality of longitudinal bolts, and a plurality of transverse bolts, wherein each of the plurality of transverse bolts includes a transverse bolt opening, a plurality of sleeves arranged in the plurality of longitudinal bolt recesses.

3. The rotor as claimed in claim 1, wherein the sleeve is made of a plastic material or includes a plastic material.

4. The rotor as claimed in claim 1 wherein the cavity of the sleeve includes internal threads.

5. The rotor as claimed in claim 4 wherein the internal threads are arranged in a section adjoining the first sleeve end and the second sleeve end.

6. The rotor as claimed in claim 1 wherein at least one of the first or second sleeve sections is arranged within the transverse bolt opening.

7. The rotor as claimed in claim 1, wherein the sleeve has a passage axis and a radial encompassing wall with an outer circumferential surface, wherein at least one web is arranged on the outer circumferential surface and has a longitudinal axis that is substantially parallel to the passage axis of the sleeve.

8. The rotor as claimed in claim 1, wherein the sleeve extends substantially from a face-side-facing end to a face-side-averted end of the longitudinal bolt recess.

9. The rotor as claimed in claim 1, wherein the sleeve is spaced from a face side of the at least one rotor blade, from a face-side-facing end of the longitudinal bolt recess, or from a face-side-averted end of the longitudinal bolt recess, and wherein the spacing is less than 25% of a longitudinal axis length of the longitudinal bolt recess.

10. The rotor as claimed in claim 1, wherein the sleeve has at least one rib arranged in the cavity of the sleeve.

11. The rotor as claimed in claim 8, comprising an expansion sleeve recess arranged on the face-side-averted side of the transverse bolt, wherein the expansion sleeve recess extends substantially parallel to the longitudinal axis of the at least one rotor blade and coaxially with respect to the longitudinal bolt recess.

12. A wind power installation comprising:
   the rotor of claim 1, wherein the transverse bolt recess is a first transverse bolt recess, wherein the transverse bolt is a first transverse bolt, wherein the longitudinal bolt recess is a first longitudinal bolt recess, wherein the longitudinal bolt is a first longitudinal bolt, wherein the connecting region is a first connecting region, wherein the at least one rotor blade includes a rotor blade inner part which comprises a blade root and a rotor blade outer part which comprises a blade tip, wherein the rotor blade inner part and the rotor blade outer part are connected to one another in a second connecting region, wherein the second connecting region includes:
   a second transverse bolt recess in the rotor blade inner part extending substantially radially with respect to a longitudinal axis of the at least one rotor blade;
   a second transverse bolt arranged in the second transverse bolt recess, wherein the second transverse bolt has an opening that extends radially with respect to a longitudinal axis of the second transverse bolt;
   a second longitudinal bolt recess which extends substantially parallel to the longitudinal axis of the at least one rotor blade and which extends at a first end of the rotor blade outer part to a second end at the second transverse bolt recess, wherein the second longitudinal bolt recess, the second transverse bolt recess, and the opening of the second transverse bolt form a common passage; and
   a second sleeve arranged in the second longitudinal bolt recess, wherein a second longitudinal bolt extends through a cavity of the second sleeve, and a section of the second longitudinal bolt is arranged within the opening of the second transverse bolt.

13. A wind power installation comprising a tower and the rotor as claimed in claim 1.

14. The rotor as claimed in claim 1 wherein the sleeve includes two parts that are coupled together in a longitudinal direction.

15. The rotor as claimed in claim 1 wherein the sleeve adjoins a face side of the at least one rotor blade, a face-side-facing end of the longitudinal bolt recess, or a face-side-averted end of the longitudinal bolt recess.

16. A rotor blade for a wind power installation, the rotor blade comprising:
   a rotor blade body extending from a blade root to a blade tip in a longitudinal direction having a longitudinal axis, wherein the blade root is configured to fasten the rotor blade to a rotor hub, wherein the rotor blade body includes a rotor blade inner part which comprises the blade root and a rotor blade outer part which comprises the blade tip, wherein the rotor blade inner part and the rotor blade outer part are connected to one another in a connecting region, wherein the connecting region includes:
      a transverse bolt recess in the rotor blade inner part extending substantially radially with respect to the longitudinal axis of the rotor blade, a transverse bolt arranged in the transverse bolt recess, wherein the transverse bolt has a transverse bolt opening that extends radially with respect to a longitudinal axis of the transverse bolt;
      a longitudinal bolt recess which extends substantially parallel to the longitudinal axis of the rotor blade and which extends at a first end of the rotor blade outer part to a second end at the transverse bolt recess, wherein the longitudinal bolt recess, the transverse bolt recess, and the transverse bolt opening form a common passage; and
      a sleeve arranged in the longitudinal bolt recess, wherein a longitudinal bolt extends through a cavity of the sleeve, and a section of the longitudinal bolt is arranged within the transverse bolt opening,
   wherein the sleeve extends from a first sleeve end to a second sleeve end, wherein the sleeve includes a first sleeve section at the first sleeve end having a first outer diameter, and includes a second sleeve section at the second sleeve end having a second outer diameter, wherein the second outer diameter is different from the first outer diameter.

17. A method comprising:
   coupling a first rotor blade part to a second rotor blade part by:
      arranging a transverse bolt within a transverse bolt recess of at least one of: the first rotor blade part or the second rotor blade part, wherein the transverse bolt recess extends substantially radially with respect to a longitudinal axis of the rotor blade;
      arranging a sleeve within a longitudinal bolt recess in at least one of: the first rotor blade part or the second rotor blade part, the sleeve including a cavity, wherein the longitudinal bolt recess extends substantially parallel to the longitudinal axis of the rotor blade wherein the sleeve extends from a first sleeve end to a second sleeve end, wherein the sleeve includes a first sleeve section at the first sleeve end having a first outer diameter, and includes a second sleeve section at the second sleeve end having a second outer diameter, wherein the second outer diameter is different from the first outer diameter; and
      arranging a longitudinal bolt within a common passage formed by the longitudinal bolt recess, the cavity of the sleeve, and the transverse bolt recess.

18. The method as claimed in claim 17, comprising at least one of:
   fastening the longitudinal bolt within the transverse bolt recess, wherein the transverse bolt opening has internal threads and the longitudinal bolt has external threads;
   arranging an expansion sleeve within an expansion sleeve recess, wherein the expansion sleeve recess is arranged on a face-side-averted side of the transverse bolt opening; or
   leading a longitudinal bolt through the transverse bolt opening and connecting the longitudinal bolt to the expansion sleeve.

* * * * *